(12) United States Patent
Majewski et al.

(10) Patent No.: US 12,485,085 B2
(45) Date of Patent: Dec. 2, 2025

(54) PPAR AGONIST COMPLEX AND METHODS OF USE

(71) Applicant: RODAN & FIELDS, LLC, San Francisco, CA (US)

(72) Inventors: George P. Majewski, Walnut, CA (US); John Simon Craw, San Francisco, CA (US)

(73) Assignee: Rodan & Fields, LLC

(*) Notice: Subject to any disclaimer, the term of this patent is extended or adjusted under 35 U.S.C. 154(b) by 584 days.

(21) Appl. No.: 17/781,416

(22) PCT Filed: Dec. 14, 2020

(86) PCT No.: PCT/US2020/064798
§ 371 (c)(1),
(2) Date: Jun. 1, 2022

(87) PCT Pub. No.: WO2021/138031
PCT Pub. Date: Jul. 8, 2021

(65) Prior Publication Data
US 2023/0000759 A1 Jan. 5, 2023

Related U.S. Application Data

(60) Provisional application No. 62/955,055, filed on Dec. 30, 2019.

(51) Int. Cl.
| | |
|---|---|
| *A61K 8/9789* | (2017.01) |
| *A61K 8/36* | (2006.01) |
| *A61K 8/37* | (2006.01) |
| *A61Q 17/00* | (2006.01) |
| *A61Q 19/00* | (2006.01) |
| *A61Q 19/08* | (2006.01) |

(52) U.S. Cl.
CPC ........... *A61K 8/9789* (2017.08); *A61K 8/361* (2013.01); *A61K 8/375* (2013.01); *A61Q 17/00* (2013.01); *A61Q 19/004* (2013.01); *A61Q 19/007* (2013.01); *A61Q 19/08* (2013.01)

(58) Field of Classification Search
None
See application file for complete search history.

(56) References Cited

U.S. PATENT DOCUMENTS

| | | | |
|---|---|---|---|
| 5,641,504 A * | 6/1997 | Lee | A61K 9/0014 424/447 |
| 7,838,025 B2 | 11/2010 | Koenig et al. | |
| 8,133,917 B2 | 3/2012 | Rimando et al. | |
| 8,252,845 B1 | 8/2012 | Rimando et al. | |
| 9,980,924 B2 | 5/2018 | Meyskens et al. | |
| 2004/0115331 A1 | 6/2004 | Eggink et al. | |
| 2004/0146482 A1* | 7/2004 | Pauly | A61K 31/19 424/74 |
| 2005/0158258 A1* | 7/2005 | Fisher | A61Q 19/08 514/440 |
| 2006/0057231 A1 | 3/2006 | Rimando et al. | |
| 2007/0020220 A1 | 1/2007 | Osborne | |
| 2014/0120141 A1 | 5/2014 | Anton et al. | |
| 2018/0140528 A1 | 5/2018 | Lee et al. | |

FOREIGN PATENT DOCUMENTS

| | | |
|---|---|---|
| CN | 1905891 A | 1/2007 |
| CN | 101268145 A | 9/2008 |
| CN | 108883036 A | 11/2018 |
| CN | 110731929 A | 1/2020 |
| WO | 2000016752 A2 | 3/2000 |
| WO | 2004037225 A2 | 5/2004 |
| WO | 2016036999 A1 | 3/2016 |
| WO | 2019060357 A1 | 3/2019 |

OTHER PUBLICATIONS

Moy et al., "Sandalwood Album Oil as a Botanical Therapeutic in Dermatology," J. Clin. Aesthet. Dermatol. 10(10):34-39 (2017).
Moya-Camarena et al., "Conjugated Linoleic Acid is a Potent Naturally Occurring Ligand and Activator of PPARalpha," J. Lipid Res. 40(8):1426-1433 (1999).
Nugteren et al., "Naturally Occurring Conjugated Octadecatrienoic Acids are Strong Inhibitors of Prostaglandin Biosynthesis," Prostaglandins 33(3):403-417 (1987).
Oh et al., "The Molecular Revolution in Cutaneous Biology: EDC and Locus Control," J. Invest. Dermatol. 137(5):e101-e104 (2017).
Ohtera et al., "Identification of a New Type of Covalent PPARγ Agonist Using a Ligand-Linking Strategy," ACS Chem. Biol. 10(12):2794-2804 (2015).
Li et al., "The Role of Ceramides in Skin Homeostasis and Inflammatory Skin Diseases," J. Dermatol. Sci. 97(1):2-8 (2020).
Rageeb et al., "In Vitro Anti-Inflammatory Activity of Pterocarpus Marsupium Roxb. Stem Bark on Albino Rats," Journal of Pharmaceutical and Scientific Innovation 1(2):21-25 (2012).
Rimando et al., "Pterostilbene, a New Agonist for the Peroxisome Proliferator-Activated Receptor Alpha-Isoform, Lowers Plasma Lipoproteins and Cholesterol in Hypercholesterolemic Hamsters," J. Agric .Food Chem. 53(9):3403-3407 (2005).
Rivier et al., "Differential Expression of Peroxisome Proliferator-Activated Receptor Subtypes During the Differentiation of Human Keratinocytes," J. Invest. Dermatol. 111(6):1116-1121 (1998).

(Continued)

*Primary Examiner* — Susan Hoffman
(74) *Attorney, Agent, or Firm* — Goodwin Procter LLP

(57) ABSTRACT

Compositions and topical formulations comprising a PPAR agonist complex comprising glyceryl linoleate, glyceryl linolenate, xymenynic acid, and *Pterocarpus marsupium* bark extract are described herein. Methods of inducing skin barrier repair, increasing the biosynthesis of barrier lipids and proteins in the skin, stimulating hair growth, treating acne and combinations thereof utilizing the composition and topical formulations are also provided herein.

20 Claims, 9 Drawing Sheets

(56) References Cited

Rivier et al., "Peroxisome Proliferator-Activated Receptor-Alpha Enhances Lipid Metabolism in a Skin Equivalent Model," J. Invest. Dermatol. 114(4):681-687 (2000).
Robertshaw et al., "Pioglitazone: A Promising Therapy for Psoriasis," Br. J. Dermatol. 152(1):189-191 (2005).
Roupe et al., "Pharmacometrics of Stilbenes: Seguing Towards the Clinic," Curr. Clin. Pharmacol. 1(1):81-101 (2006).
Schleehauf, Sabinsa Cosmetics' pTeroWhite, Feb. 13, 2019, <https://www.cosmeticsandtoiletries.com/formulating/category/natural/Sabinsa-Cosmetics-pTeroWhite-505801751.html>.
Schmuth et al., "Role of PPAR, LXR, and PXR in Epidermal Homeostasis and Inflammation," Biochim. Biophys. Acta. 1841(3):463-473 (2014).
Schütz et al., "Bio-Derived Hydroxystearic Acid Ameliorates Skin Age Spots and Conspicuous Pores," Int. J. Cosmet. Sci. 41(3):240-256 (2019).
Sertznig et al., "Peroxisome Proliferator-Activated Receptors (PPARs) in Dermatology: Challenge and Promise," Dermatoendocrinol. 3(3):130-135 (2011).
Shafiq et al., "Pilot Trial: Pioglitazone Versus Placebo in Patients with Plaque Psoriasis (the P6)," Int. J. Dermatol. vol. 44(4):328-333 (2005).
Shang et al., "Cooperative Cobinding of Synthetic and Natural Ligands to the Nuclear Receptor PPARγ," eLife 7:e43320 (2018).
Sierra et al., "Substituted 2-[(4-Aminomethyl)phenoxy]-2-methylpropionic Acid PPARalpha Agonists. 1. Discovery of a Novel Series of Potent HDLc Raising Agents," J. Med. Chem. 50(4):685-695 (2007).
Takeda et al., "Strawberry Seed Extract and its Major Component, Tiliroside, Promote Ceramide Synthesis in the Stratum Corneum of Human Epidermal Equivalents," PLoS One 13(10):e020561 (2018).
Wiechers et al., "A New Mechanism of Action for Skin Whitening Agents: Binding to the Peroxisome Proliferator- Activated Receptor," Int. J. Cosmet. Sci. 27(2):123-132 (2005).
Ximenynic Acid, Jun. 18, 2019, entire document, https://en.wikipedia.org/w/index.php?title=Ximenynic_acid&oldid=902336690.
Yamamoto et al., "Molecular Association Model of PPARα and its New Specific and Efficient Ligand, Pemafibrate: Structural Basis for SPPARMα," Biochem. Biophys. Res. Commun. 499(2):239-245 (2018).
Zhang et al., "Topically Applied Ceramide Accumulates in Skin Glyphs," Clin. Cosmet. Investig. Dermatol. 8:329-337 (2015).
Zoete et al., "Peroxisome Proliferator-Activated Receptor Structures: Ligand Specificity, Molecular Switch and Interactions with Regulators," Biochim. Biophys. Acta. 1771(8):915-925 (2007).
Majewski et al., "Accelerated Barrier Repair in Human Skin Explants Induced with a Plant-Derived PPAR-a Activating Complex via Cooperative Interactions", PMID: 34566418 PMCID: PMC8458040 DOI: 10.2147/CCID.S325967, Clin Cosmet Investig Dermatol. 2021; 14: 1271-1293., 2021.
Al Yacoub et al., "PPARdelta is a Type 1 IFN Target Gene and Inhibits Apoptosis in T Cells," J. Invest. Dermatol. 128(8):1940-1949 (2008).
Angeli et al., "Peroxisome Proliferator-Activated Receptor Gamma Inhibits the Migration of Dendritic Cells: Consequences for the Immune Response," J. Immunol. 170(10):5295-5301 (2003).
Bais et al., "The Molecular Regulation of Stilbene Phytoalexin Biosynthesis in Vitis Vinifera During Grape Berry Development," Aust. J. Plant Physiol. 27:425-433 (2000).
Batheja et al., "Effects of Growth Conditions on the Barrier Properties of a Human Skin Equivalent," Pharm Res. 26(7):1689-1700 (2009).
Behshad et al., "A Retrospective Case Series Review of the Peroxisome Proliferator-Activated Receptor Ligand Rosiglitazone in the Treatment of Atopic Dermatitis," Arch. Dermatol. 144(1):84-88 (2008).
Berger et al., "The Mechanisms of Action of PPARs," Annu. Rev. Med. 53:409-435 (2002).
Billoni et al., "Expression of Peroxisome Proliferator Activated Receptors (PPARs) in Human Hair Follicles and PPAR alpha Involvement in Hair Growth," Acta Derm. Venereol. 80(5):329-334 (2000).
Boguniewicz et al., "Atopic Dermatitis: A Disease of Altered Skin Barrier and Immune Dysregulation," Immunol. Rev. 242(1):233-246 (2011).
Bongartz et al., "Treatment of Active Psoriatic Arthritis with the PPARgamma Ligand Pioglitazone: An Open-Label Pilot Study," Rheumatology 44(1):126-129 (2005).
Braissant et al., "Differential Expression of Peroxisome Proliferator-Activated Receptor-alpha, -beta, and -gamma During Rat Embryonic Development," Endocrinology 139(6): 2748-2754 (1998).
Braissant et al., "Differential Expression of Peroxisome Proliferator-Activated Receptors (PPARs): Tissue Distribution pf PPAR-alpha, -beta, and -gamma in the Adult Rat," Endocrinology 137(1):354-366 (1996).
Chawla et al., "Nuclear Receptors and Lipid Physiology: Opening the X-Files," Science 294(5548):1866-1870 (2001).
Chon et al., "Keratinocyte Differentiation and Upregulation of Ceramide Synthesis Induced by an Oat Lipid Extract via the Activation of PPAR Pathways," Exp. Dermatol. 24(4):290-295 (2015).
Cox, "Rationally Designed PPARδ-Specific Agonists and Their Therapeutic Potential for Metabolic Syndrome," Proc. Natl. Acad. Sci. USA 114(13):3284-3285 (2017).
Dahten et al., "Systemic PPARgamma Ligation Inhibits Allergic Immune Response in the Skin," J. Invest. Dermatol. 128(9):2211-2218 (2008).
Del Rosso et al., "Understanding the Epidermal Barrier in Healthy and Compromised Skin: Clinically Relevant Information for the Dermatology Practitioner," J. Clin. Aesthet. Dermatol. 9(4 suppl 1):S2-S8 (2016).
Demento et al. "Improving the Quality of Skin Barrier Function with PPAR-Activating Technology," Journal of the American Academy of Dermatology 70:AB64 (2014).
Downie et al., "Peroxisome Proliferator-Activated Receptor and Farnesoid X Receptor Ligands Differentially Regulate Sebaceous Differentiation in Human Sebaceous Gland Organ Cultures in vitro," British J. Dermatol. 151(4):766-775 (2004).
Dubrac et al., "Peroxisome Proliferator-Activated Receptor-alpha Activation Inhibits Langerhans Cell Function," J. Immunol. 178(7):4362-4372 (2007).
Dubrac et al., "PPAR-alpha in Cutaneous Inflammation," Dermatoendocrinol. 3(1):23-26 (2011).
Dwivedi et al., "Chemopreventive Effects of Sandalwood Oil on Skin Papillomas in Mice," Eur. J. Cancer Prev. 6(4):399-401 (1997).
Eastham et al., "PPARalpha/gamma Expression and Activity in Mouse and Human Melanocytes and Melanoma Cells," Pharm. Res. 25(6):1327-1333 (2008).
Eissa et al., "Human Tissue Kallikreins as Promiscuous Modulators of Homeostatic Skin Barrier Functions," Biol. Chem. 389(6):669-680 (2008).
Elias et al., "Interactions Among Startum Corneum Defensive Functions," Exp. Dermatol. 14(10):719-726 (2005).
Evans et al., "PPARs and the Complex Journey to Obesity," Nat. Med. 10(4):355-361 (2004).
Faveeuw et al., "Peroxisome Proliferator-Activated Receptor gamma Activators Inhibit Interleukin-12 Production in Murine Dendritic Cells," FEBS Lett. 486(3):261-266 (2000).
Fluhr et al., "Topical Peroxisome Proliferator Activated Receptor Activators Accelerate Postnatal Stratum Corneum Acidification," J. Invest. Dermatol. 129(2):365-374 (2009).

(56) References Cited

OTHER PUBLICATIONS

Forman et al., "15-Deoxy-delta 12, 14-prostaglandin J2 is a Ligand for the Adipocyte Determination Factor PPAR Gamma," Cell 83(5):803-812 (1995).
Forman et al., "Hypolipidemic Drugs, Polyunsaturated Fatty Acids, and Eicosanoids are Ligands for Peroxisome Proliferator-Activated Receptors Alpha and Delta," Proc. Natl. Acad. Sci. U S A 94(9):4312-4317 (1997).
Goleva et al., "Epithelial Barrier Repair and Prevention of Allergy," J. Clin. Investl. 129(4):1463-1474 (2019).
Greene et al., "PPARgamma: Observations in the Hematopoietic System," Prostaglandins Other Lipid Mediat. 62(1):45-73 (2000).
Hanley et al., "Fetal Epidermal Differentiation and Barrier Development In Vivo is Accelerated by Nuclear Hormone Receptor Activators," J. Invest. Dermatol. 113(5):788-795 (1999).
Hanley et al., "Glucosylceramide Metabolism is Regulated During Normal and Hormonally Stimulated Epidermal Barrier Development in the Rat," J. Lipid Res. 38(3):576-584 (1997).
Hanley et al., "Keratinocyte Differentiation is Stimulated by Activators of the Nuclear Hormone Receptor PPARalpha," J. Invest. Dermatol. 110(4):368-375 (1998).
Hettiarachchi et al., "Western Australian Sandalwood Seed Oil: New Opportunities," Lipid Technology 2(2):27-29 (2010).
International Search Report and Written Opinion for PCT/US2020/064798 mailed Mar. 22, 2021.
Jung et al., "Peroxisome Proliferator-Activated Receptor γ-Mediated Suppression of Dendritic Cell Function Prevents the Onset of Atopic Dermatitis in NC/Tnd Mice," J. Allergy Clin. Immunol. 127(2):420-429 (2011).
Kang et al., "Peroxisome Proliferator-Activated Receptors-Gamma Activator, Ciglitazone, Inhibits Human Melanocyte Growth Through Induction of Apoptosis," Arch. Dermatol. Res. 297(10):472-476 (2006).
Kezic et al., "Filaggrin and Skin Barrier Function," Curr. Probl. Dermatol. 49:1-7 (2016).
Kim et al., "Limited Cooperation Between Peroxisome Proliferator-Activated Receptors and Retinoid X Receptor Agonists in Sebocyte Growth and Development," Mol. Genet. Metab. 74(3):362-369 (2001).
Kuwabara et al., "Peroxisome Proliferator-Activated Receptors (PPARs) have Multiple Binding Points that Accommodate Ligands in Various Conformations: Phenylpropanoic Acid-Type PPAR Ligands Bind to PPAR in Different Conformations, Depending on the Subtype," J. Med. Chem. 55(2):893-902 (2012).
Kypriotou et al., "The Human Epidermal Differentiation Complex: Cornified Envelope Precursors, S100 Proteins and the 'Fused Genes' Family," Exp. Dermatol. 21(9):643-649 (2012).
Kömüves et al., "Keratinocyte Differentiation in Hyperproliferative Epidermis: Topical Application of PPARalpha Activators Restores Tissue Homeostasis," J. Invest. Dermatol. 115(3):361-367 (2000).
Kömüves et al., "Ligands and Activators of Nuclear Hormone Receptors Regulate Epidermal Differentiation During Fetal Rat Skin Development," J. Invest. Dermatol. 111(3):429-433 (1998).
Lee et al., "PPAR-Gamma Agonist, Ciglitazone, Increases Pigmentation and Migration of Human Melanocytes," Exp. Dermatol. 16(2):118-123 (2007).
Li et al., "Growth Inhibition and Differentiation Induced by Peroxisome Proliferator Activated Receptor Gamma Ligand Rosiglitazone in Human Melanoma Cell Line A375," Med. Oncol. 23(3):393-402 (2006).
Li et al., "Comparative Effects of Sandalwood Seed Oil on Fatty Acid Profiles and Inflammatory Factors in Rats," Lipids 48(2):105-113 (2013).
Michalik et al., "Peroxisome Proliferator-Activated Receptors (PPARs) in Skin Health, Repair and Disease," Biochim. Biophys. Acta 1771(8):991-998 (2007).
Mittal et al., "Efficacy and Safety of Combination Acitretin and Pioglitazone Therapy in Patients with Moderate to Severe Chronic Plaque-Type Psoriasis: A Randomized, Double-Blind, Placebo-Controlled Clinical Trial," Arch. Dermatol. 145(4):387-393 (2009).
Mizutani et al., "Cooperative Synthesis of Ultra Long-Chain Fatty Acid and Ceramide During Keratinocyte Differentiation," PLoS One 8(6):e67317 (2013).

\* cited by examiner

PPAR AGONIST COMPLEX AND METHODS OF USE

CROSS REFERENCE TO RELATED APPLICATIONS

This application is a National Phase application of PCT Application No. PCT/US2020/064798, filed Dec. 14, 2020, which claims the benefit of U.S. Provisional Application No. 62/955,055 filed Dec. 30, 2019, each are hereby incorporated by reference in their entirety.

SUMMARY

Embodiments disclosed herein are directed to compositions comprising a combination of three or more PPAR agonists. Embodiments disclosed herein are directed to compositions comprising an effective amount of three or more PPAR agonists selected from the group consisting of glyceryl linoleate, glyceryl linolenate, xymenynic acid, and *Pterocarpus marsupium* bark extract.

Embodiments disclosed herein are directed to compositions comprising an effective amount of the following PPAR agonists: glyceryl linoleate, glyceryl linolenate, xymenynic acid, and *Pterocarpus marsupium* bark extract.

Embodiments disclosed herein are directed to a topical formulation comprising a composition having an effective amount of three or more PPAR agonists selected from the group consisting of glyceryl linoleate, glyceryl linolenate, xymenynic acid, and *Pterocarpus marsupium* bark extract, and pharmaceutically or cosmetically acceptable excipients, wherein the topical formulation is suitable for topical administration.

Embodiments disclosed herein are directed to a topical formulation comprising a composition having an effective amount of the following PPAR agonists: glyceryl linoleate, glyceryl linolenate, xymenynic acid, and *Pterocarpus marsupium* bark extract, and pharmaceutically or cosmetically acceptable excipients, wherein the topical formulation is suitable for topical administration.

Embodiments disclosed herein are directed to methods of inducing skin barrier repair comprising topically administering a topical formulation comprising a composition having an effective amount of three or more PPAR agonists selected from the group consisting of glyceryl linoleate, glyceryl linolenate, xymenynic acid, and *Pterocarpus marsupium* bark extract, and pharmaceutically or cosmetically acceptable excipients, wherein the topical formulation is suitable for topical administration. Embodiments disclosed herein are directed to methods of inducing skin barrier repair comprising topically administering a topical formulation comprising a composition having an effective amount of the following PPAR agonists: glyceryl linoleate, glyceryl linolenate, xymenynic acid, and *Pterocarpus marsupium* bark extract, and pharmaceutically or cosmetically acceptable excipients, wherein the topical formulation is suitable for topical administration. In embodiments, inducing skin barrier repair results in the biosynthesis of barrier lipids and proteins in the skin selected from the group consisting of ceramides, filaggrin, trans-glutaminase 1, TGFB1, keratins, LCE1D, CERS3, CDH1, FOXO1, HSP27, involucrin, loricrin, beta-glucocerebrosidase, aquaporin 3, ABCA12, ADRP, FIAF, and combinations thereof. In embodiments, inducing skin barrier repair results in the modulation of the expression of barrier genes in the skin selected from the group consisting of ceramides, filaggrin, trans-glutaminase 1, TGFB1, keratins, LCE1D, CERS3, CDH1, FOXO1, HSP27, involucrin, loricrin, beta-glucocerebrosidase, aquaporin 3, ABCA12, ADRP, FIAF, and combinations thereof.

BRIEF DESCRIPTION OF THE DRAWINGS

For a fuller understanding of the nature and advantages of the present embodiments, reference should be made to the following detailed description taken in connection with the accompanying drawings, in which.

DETAILED DESCRIPTION

Skin

Figure 1:
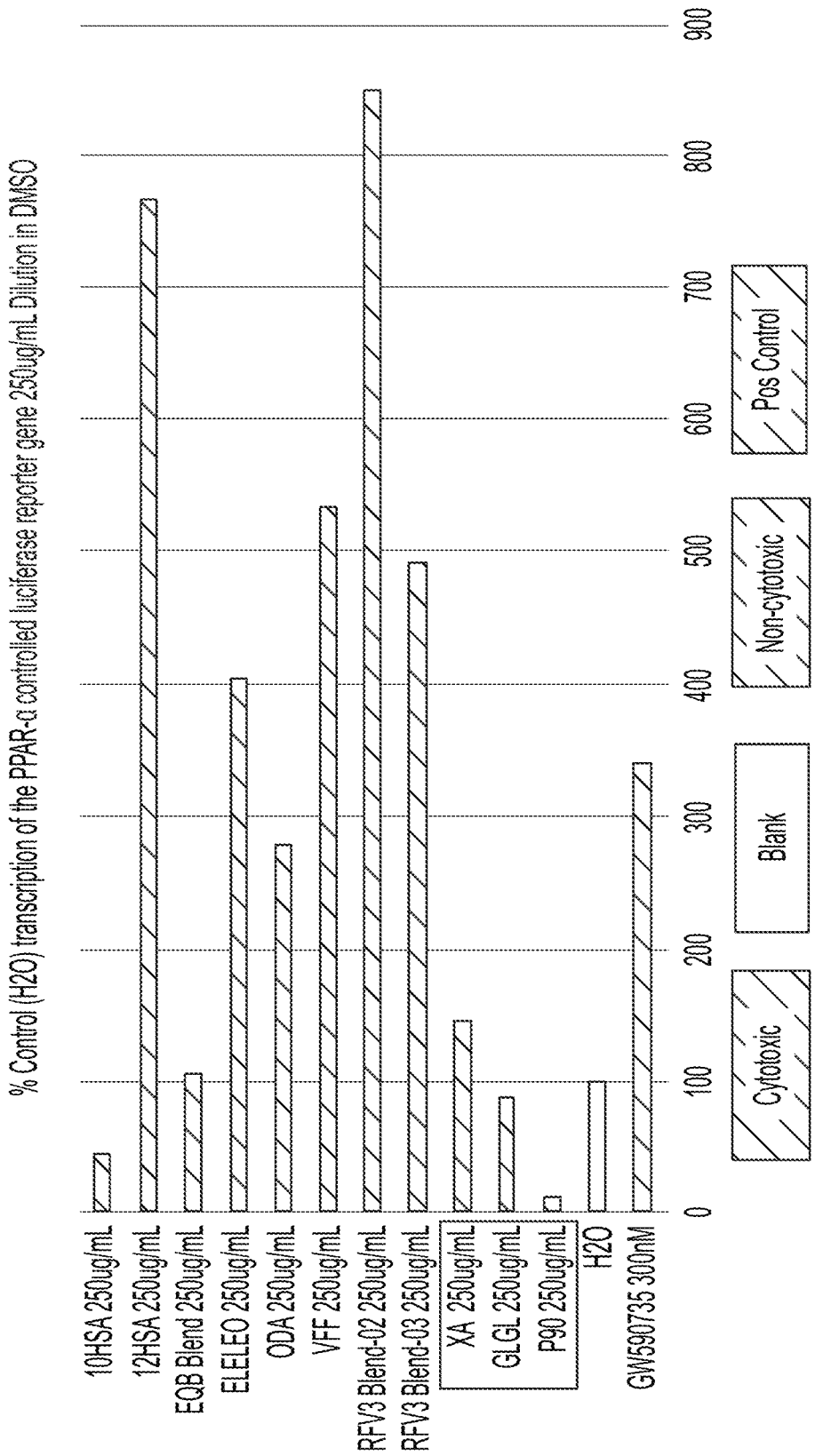
FIG. 1 presents percent of control of each test material at 250 µg/mL Dilution in the PPAR-α luciferase experiment.

Barrier lotions, creams and ointments including over-the-counter skin protectants utilize ingredient chemistries which generally approach improving barrier function through physical methods, such as occlusive hydrophobic barriers and film formers (i.e. petrolatum, dimethicone, lanolin). Such products have limitations as they only provide a temporary hydrophobic surface barrier effect which is not part of skin's natural and healthy barrier function. Whereas, direct administration of biomimetic and precursor topical ingredients, i.e. ceramides, cholesterol, other biopmimetic lipids, also present limitations, including challenges in topically delivering ceramides with limited absorption and distribution within lamellae bodies or identifying which of the large number of epidermal ceramides to utilize. Ceramides have been classified into 19 categories based on their sphingoid base and fatty acid moieties and topical use of only 1 or 2 may be of limited value. To prepare a truly biomimetic topical composition which is most consistent with skin's natural compositions is very difficult.

Peroxisome proliferator-activated receptor alpha (PPARα) is a nuclear hormone receptor involved in the transcriptional regulation of lipid metabolism, fatty acid oxidation, and glucose homeostasis. Its activation stimulates antioxidant enzymes such as catalase, whose expression is decreased in aged human skin. PPARα mRNA levels have been shown to be significantly decreased in intrinsically aged and photoaged human skin as well as in UV-irradiated skin. Furthermore, PPARα activation-induced upregulation of catalase leads to scavenging of ROS produced due to UV irradiation or aging. PPARα activation triggers catalase expression and ROS scavenging, thereby protecting skin from UV-induced damage and intrinsic aging.

The PPAR agonist complex described herein activates the skin's natural biosynthetic barrier lipids and epidermal proteins, i.e. ceramides, filaggrin, transglutaminase, also known as the "Barrier Repair Cascade." Embodiments described herein are directed to a topical PPAR agonist complex composition comprising glyceryl linoleate, glyceryl linolenate, xymenynic acid and *Pterocarpus marsupium* bark extract. The PPAR agonist complex described herein is used to improve skin barrier function, improve skin surface texture, provide desquamation, improve skin brightening, mitigates irritation, and supports the skin's natural ability to defend itself against environmental stressors.

Hair

PPAR pathways and activation are also implicated in the metabolic activities of both hair follicles and sebaceous glands and are involved in hair growth.

Peroxisome proliferator-activated receptors (PPARs), which belong to the nuclear hormone receptor superfamily, are potent key regulators of epidermal development. PPAR alpha, -delta and -gamma are expressed in both dermal and epithelial human hair follicle cells.

The PPAR agonist complex described herein activates hair follicles and sebaceous glands, i.e. by stimulating collagen 17, a critical molecule for HFSC (hair follicle stem cell) maintenance. Embodiments described herein are directed to a topical PPAR agonist complex composition comprising glyceryl linoleate, glyceryl linolenate, xymenynic acid and *Pterocarpus marsupium* bark extract. The PPAR agonist complex described herein is used to stimulate hair growth, maintain healthy hair, increase hair density and volume, and improve the look and feel of hair.

Acne

The condition of acne involves excessive keratinocyte proliferation and abnormal desquamation which contributes to clogged pores and plugged follicles leading to pathogenic behavior by *P. acnes* bacteria. Increased sebum levels combined with follicular hyperkeratinization are a prerequisite of acne vulgaris. As peroxisome proliferator-activated receptors (PPARs) are known to control lipid metabolism in several human tissues they have been considered to be involved in the pathogenesis of acne vulgaris. PPAR activators offer antiapoptotic effects, promotes keratinocyte differentiation, and maintains epidermal homeostasis. Normalizing keratinocytes differentiation and desquamation is essential for managing acne breakouts.

The main function of the human sebaceous gland is sebum excretion. PPAR agonists may modulate sebaceous secretions by increasing sebum secretion, as well as modifying the differentiation and lipid metabolism of sebocytes. The composition of sebum and clearance from the ducts and follicles is important. Thick, sticky sebum may contribute to follicle clogging which is known to promote proliferative and pathogenic activity by *P. acnes* bacteria. Increasing sebum secretion or thinning sebum may help clear plugs.

PPAR agonists may also provide beneficial anti-inflammatory activity for minimizing the appearance of acne and calming irritation associated with acne lesions.

The PPAR agonist complex described herein modulates sebaceous glands, i.e. by activating PKB/Akt and p44/42, two kinases involved in antiapoptosis and proliferation, respectively or decreasing arachidonic acid-derived ketometabolites (e.g. 5KETE, 12KETE) known to be increased in acne-prone skin. Embodiments described herein are directed to a topical PPAR agonist complex composition comprising glyceryl linoleate, glyceryl linolenate, xymenynic acid and *Pterocarpus marsupium* bark extract. The PPAR agonist complex described herein is used to treat acne vulgaris, decrease inflammation and irritation caused by acne lesions, inhibit *P. acnes*, prevent follicle clogging, and reduce the number of acne lesions.

Without wishing to be bound by theory, glyceryl linoleate, glyceryl linolenate are not known to induce PPAR agonist activity. Hydrolysis by esterase enzymes in skin leads to the release of known PPAR agonists (linoleic and linolenic acids). When tested in combination glyceryl linoleate plus glyceryl linolenate do not demonstrate significant PPAR activity. Glyceryl linoleate and glyceryl linolenate in combination with xymenynic acid provide a great solvent for *Pterocarpus marsupium* Bark Extract and are highly penetrative polar oil carriers.

Without wishing to be bound by theory, xymenynic acid (acetylenic fatty acid) is a very mild PPARα agonist, a moderate PPARγ agonist with irreversible binding to arachidonic acid. Also, it provides a benefit in that it is a solvent aid for *Pterocarpus marsupium* Bark Extract, helping to prevent crystallization on freeze-thaw.

Without wishing to be bound by theory, *Pterocarpus marsupium* bark extract is not known to be a PPAR agonist but the major stilbene (90% pterostilbene) is known to be a PPAR agonist in a synthetic form. However, at concentrations necessary to provide any beneficial effect, *Pterocarpus marsupium* bark extract, tested alone, did not produce a PPAR agonist effect due to its high cytotoxicity. *Pterocarpus marsupium* Bark Extract is beneficial because there is no color change over time as with other stilbenes, it activates sirtuins, is an inhibitor of COX-2, and has anti-glycation activity.

Various aspects will be described in detail hereinafter. Such aspects may, however, be embodied in many different forms and should not be construed as limited to the embodiments set forth herein; rather, these embodiments are provided so that this disclosure will be thorough and complete, and will fully convey its scope to those skilled in the art.

Where a range of values is provided, it is intended that each intervening value between the upper and lower limit of that range and any other stated or intervening value in that stated range is encompassed within the disclosure. For example, if a range of 1 wt % to 8 wt % is stated, it is intended that 2 wt %, 3 wt %, 4 wt %, 5 wt %, 6 wt %, and 7 wt % are also explicitly disclosed, as well as the range of values greater than or equal to 1 wt % and the range of values less than or equal to 8 wt %.

All percentages, parts and ratios are based upon the total weight of the formulations and compositions and all measurements made are at about 25° C., unless otherwise specified.

The singular forms "a," "an," and "the" include plural referents unless the context clearly dictates otherwise. Thus, for example, reference to a "polymer" includes a single polymer as well as two or more of the same or different polymers; reference to an "excipient" includes a single excipient as well as two or more of the same or different excipients, and the like.

The word "about" when immediately preceding a numerical value means a range of plus or minus 10% of that value, e.g., "about 50" means 45 to 55, "about 25,000" means 22,500 to 27,500, etc., unless the context of the disclosure indicates otherwise, or is inconsistent with such an interpretation. For example, in a list of numerical values such as "about 49, about 50, about 55, "about 50" means a range extending to less than half the interval(s) between the preceding and subsequent values, e.g., between 49.5 and 52.5. Furthermore, the phrases "less than about" a value or "greater than about" a value should be understood in view of the definition of the term "about" provided herein.

The terms "administer," "administering" and "administration" as used herein refer to either directly administering a compound (also referred to as an agent of interest) or pharmaceutically acceptable salt of the compound (agent of interest) or a composition to a subject.

The term "an effective amount" is used herein to refer to the amount of a composition that elicits a clinical or biological response in the skin of an individual being sought by a clinical professional or individual. A clinical or biological response may include improving or ameliorating a disease, condition or disorder in an individual. For example, an effective amount is an amount which improves the look and feel of the skin or is an amount that ameliorates the effect of aging on the skin.

The term "excipients" as used herein encompasses carriers and diluents, meaning a material, composition or vehicle, such as a liquid or solid filler, diluent, excipient, solvent or encapsulating material involved in carrying or transporting a pharmaceutical, cosmetic or other agent across a tissue layer such as the stratum corneum or stratum spinosum.

The transitional term "comprising," which is synonymous with "including," "containing," or "characterized by," is inclusive or open-ended and does not exclude additional, un-recited elements or method steps. By contrast, the transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed subject matter. In some embodiments or claims where the term comprising is used as the transition phrase, such embodiments can also be envisioned with replacement of the term "comprising" with the terms "consisting of" or "consisting essentially of."

The term "cosmetic" means an agent utilized, and/or intended to be applied to the human body for cleansing, beautifying, promoting attractiveness, altering the appearance of the skin or any combination thereof.

The term "composition" as used herein refers to a combination or a mixture of two or more different ingredients, components, or substances.

The term "keratinous fiber" as used herein refers to any tissue which contain keratin as a fibrous structural protein, including, but not limited to, skin, hair, and nails.

The term "modulation" as used herein refers to both the upregulation and/or down regulation of the genes described herein.

The phrase "pharmaceutically acceptable" or "cosmetically acceptable" is employed herein to refer to those agents of interest/compounds, salts, compositions, dosage forms, etc, which are within the scope of sound medical judgment suitable for use in contact with the tissues of human beings and/or other mammals without excessive toxicity, irritation, allergic response, or other problem or complication, commensurate with a reasonable benefit/risk ratio. In some aspects, pharmaceutically acceptable means approved by a regulatory agency of the federal or a state government, or listed in the U.S. Pharmacopeia or other generally recognized pharmacopeia for use in mammals (e.g, animals), and more particularly, in humans.

The terms "patient" and "subject" are interchangeable and may be taken to mean any living organism which may be administered and/or treated with compounds or compositions provided for herein. As such, the terms "patient" and "subject" may comprise, but is not limited to, any non-human mammal, primate or human. In some embodiments, the "patient" or "subject" is a mammal, such as mice, rats, other rodents, rabbits, dogs, cats, swine, cattle, sheep, horses, primates, or humans. In some embodiments, the patient or subject is an adult, child, or infant. In some embodiments, the patient or subject is a human.

The terms "topically" and "topical" as used herein refer to application of the compositions to the surface of the skin, mucosal cells and keratins. Examples of keratins are skin, nails and hair.

The term "treating" as used herein, refers to methods of treating a skin disorder or a systemic condition, and generally includes the administration of a compound or composition which reduces the frequency of, or delays the onset of, symptoms of a medical condition or enhance the texture, appearance, color, sensation, or hydration of the intended tissue treatment area of the tissue surface in a subject relative to a subject not receiving the compound or composition. This can include reversing, reducing, or arresting the symptoms, clinical signs, and underlying pathology of a condition in a manner to improve or stabilize a subject's condition.

By hereby reserving the right to proviso out or exclude any individual members of any such group, including any sub-ranges or combinations of sub-ranges within the group, that can be claimed according to a range or in any similar manner, less than the full measure of this disclosure can be claimed for any reason. Further, by hereby reserving the right to proviso out or exclude any individual substituents, analogs, compounds, ligands, structures, or groups thereof, or any members of a claimed group, less than the full measure of this disclosure can be claimed for any reason.

Throughout this disclosure, various patents, patent applications and publications are referenced. The disclosures of these patents, patent applications and publications in their entireties are incorporated into this disclosure by reference in order to more fully describe the state of the art as known to those skilled therein as of the date of this disclosure. This disclosure will govern in the instance that there is any inconsistency between the patents, patent applications and publications cited and this disclosure.

For convenience, certain terms employed in the specification, examples and claims are collected here. Unless defined otherwise, all technical and scientific terms used in this disclosure have the same meanings as commonly understood by one of ordinary skill in the art to which this disclosure belongs.

Compositions

Embodiments disclosed herein are directed to compositions comprising a combination of three or more PPAR agonists. Embodiments disclosed herein are directed to compositions comprising an effective amount of three or more PPAR agonists selected from the group consisting of glyceryl linoleate, glyceryl linolenate, xymenynic acid, and *Pterocarpus marsupium* bark extract.

Embodiments disclosed herein are directed to compositions comprising an effective amount of the following PPAR agonists: glyceryl linoleate, glyceryl linolenate, xymenynic acid, and *Pterocarpus marsupium* bark extract.

*Pterocarpus marsupium* bark extract (CAS No. 537-42-8) is the extract of the bark of *Pterocarpus marsupium*. *Pterocarpus marsupium* bark extract contains at least 90% pterostilbene. In some embodiments, the effective amount of *Pterocarpus marsupium* bark extract is about 1% to about 5% by weight of the topical composition. In some embodiments, the effective amount of *Pterocarpus marsupium* bark extract is about 1.5% to about 4% by weight of the topical composition. In some embodiments, the effective amount of *Pterocarpus marsupium* bark extract is about 2% by weight of the topical composition. In some embodiments, the effective amount of *Pterocarpus marsupium* bark extract is about 3% by weight of the topical composition. In some embodiments, the effective amount of *Pterocarpus marsupium* bark extract is about 4% by weight of the topical composition. In some embodiments, the effective amount of *Pterocarpus marsupium* bark extract is about 5% by weight of the topical composition.

Xymenynic acid (CAS No. 557-58-4) has the empirical formula $C_{18}H_{30}O_2$ and is represented by the following formula:

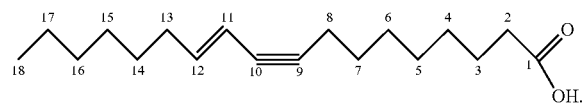

Xymenynic acid is also known as (E)-Octadec-11-en-9-ynoic acid, 11-Octadecen-9-ynoic Acid, or Ximeninic acid. In some embodiments, the effective amount of xymenynic acid is about 5% to about 10% by weight of the topical composition. In some embodiments, xymenynic acid is about 6% to about 9% by weight of the topical composition. In some embodiments, xymenynic acid is about 6% by weight of the topical composition. In some embodiments, xymenynic acid is about 7% by weight of the topical composition. In some embodiments, xymenynic acid is about 8% by weight of the topical composition. In some embodiments, xymenynic acid is about 9% by weight of the topical composition.

Glyceryl linolenate (CAS No. 18465-99-1) is the monoester of glycerin and linolenic acid, has the empirical formula $C_{21}H_{36}O_4$ and is represented by the following formula:

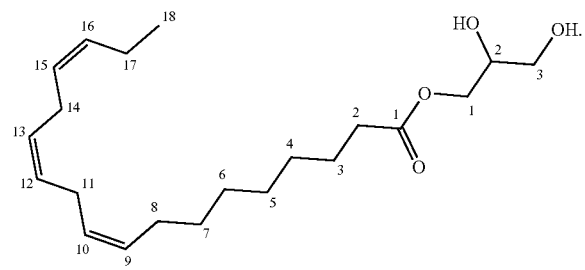

Glyceryl linolenate is also known as 2,3-dihydroxypropyl 9,12,15-octadecatrienoate, glyceryl monolinolenate, linolenic acid monoester with 1,2,3-propanetriol, or 9,12,15-octadecatrienoic acid 2,3-dihydroxypropyl ester. In some embodiments, the effective amount of glyceryl linolenate is about 5% to about 10% by weight of the topical composition. In some embodiments, the effective amount of glyceryl linolenate is about 6% to about 9% by weight of the topical composition. In some embodiments, the effective amount of glyceryl linolenate is about 6% by weight of the topical composition. In some embodiments, the effective amount of glyceryl linolenate is about 7% by weight of the topical composition. In some embodiments, glyceryl linolenate is about 8% by weight of the topical composition. In some embodiments, the effective amount of glyceryl linolenate is about 9% by weight of the topical composition.

Glyceryl linoleate (CAS No. 2277-28-3) is the monoester of glycerin and linoleic acid, has the empirical formula $C_{21}H_{38}O_4$ and is represented by the following formula:

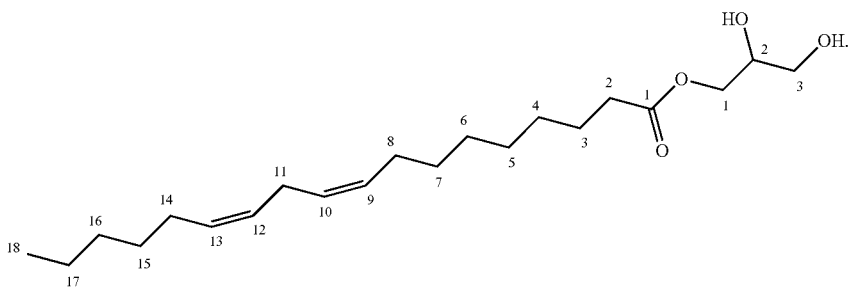 [SMILES: CCCCC/C=C\C/C=C\CCCCCCCC(=O)OCC(O)CO]

Glyceryl linoleate is also known as 2,3-dihydroxypropyl 9,12-octadecadienoate, glycerin monolinoleate, glycerol monolinoleate, glyceryl monolinoleate, linoleic acid monoester with 1,2,3-propanetriol, monolinolein, 9,12-octadecadienoic acid, 2,3-dihydroxypropyl ester, 9,12-octadecadienoic acid, monoester with 1,2,3-propanetriol, or 9,12-octadecadienoic acid (Z,Z)-monoester with 1,2,3-propanetriol. In some embodiments, the effective amount of glyceryl linoleate is greater than 50% by weight of the topical composition. In some embodiments, the effective amount of glyceryl linoleate is about 75% to about 94% by weight of the topical composition. In some embodiments, the effective amount of glyceryl linoleate is about 75% by weight of the topical composition. In some embodiments, the effective amount of glyceryl linoleate is about 80% by weight of the topical composition. In some embodiments, the effective amount of glyceryl linoleate is about 85% by weight of the topical composition. In some embodiments, the effective amount of glyceryl linoleate is about 90% by weight of the topical composition.

In some embodiments, a mixture of glyceryl linolenate and glyceryl linoleate is used. In some embodiments, the mixture of glyceryl linolenate and glyceryl linoleate is known as Vitamin F Glyceryl Ester CLR, which contains mostly esterified essential unsaturated fatty acids with a high content of biologically active linoleic acid and is obtained from vegetable oils such as peanut oil, soybean oil and rapeseed oil. Accordingly, the mixture of glyceryl linolenate and glyceryl linoleate may contain additional distribution of C16 and C18 fatty acids, wherein the additional fatty acids are present in about 1% to about 40% by weight of the mixture of glyceryl linolenate and glyceryl linoleate. In some embodiments, the effective amount of the mixture of glyceryl linolenate and glyceryl linoleate is about 85% to about 94% by weight of the topical composition. In some embodiments, the effective amount of the mixture of glyceryl linolenate and glyceryl linoleate is about 90% by weight of the topical composition.

In certain embodiments, the ratio of glyceryl linoleate to glyceryl linolenate to xymenynic acid to *Pterocarpus marsupium* bark extract is from about 25:2:2:1 to about 50:5:5:1. In certain embodiments, the ratio of glyceryl linoleate to glyceryl linolenate to xymenynic acid to *Pterocarpus marsupium* bark extract is from about 5:0.1:0.1:0.001 to about 10:1:1:0.1. In certain embodiments, wherein a mixture of glyceryl linolenate and glyceryl linoleate is used, the ratio of the glyceryl linoleate/glyceryl linolenate mixture to xymenynic acid to *Pterocarpus marsupium* bark extract is about 9:7:3 to about 10:5:1. In certain embodiments, the ratio of glyceryl linoleate to glyceryl linolenate to xymenynic acid is from about 25:2:2 to about 50:5:5. In certain embodiments, the ratio of glyceryl linoleate to glyceryl linolenate to *Pterocarpus marsupium* bark extract is from about 25:2:1 to about 50:5:1. In certain embodiments, the ratio of glyceryl linolenate to xymenynic acid to *Pterocarpus marsupium* bark extract is from about 2:2:1 to about 5:5:1. In certain embodiments, the ratio of glyceryl linoleate to xymenynic acid to *Pterocarpus marsupium* bark extract is from about 25:2:1 to about 50:5:1.

Embodiments disclosed herein are directed to a topical formulation comprising a composition having an effective amount of three or more PPAR agonists selected from the group consisting of glyceryl linoleate, glyceryl linolenate, xymenynic acid, and *Pterocarpus marsupium* bark extract, and pharmaceutically or cosmetically acceptable excipients, wherein the topical formulation is suitable for topical administration.

Embodiments disclosed herein are directed to a topical formulation comprising a composition having an effective amount of the following PPAR agonists: glyceryl linoleate, glyceryl linolenate, xymenynic acid, and *Pterocarpus marsupium* bark extract, and pharmaceutically or cosmetically acceptable excipients, wherein the topical formulation is suitable for topical administration.

In certain embodiments, the composition is part of a final formulation at about 0.5% to about 5% by weight of the final formulation. In certain embodiments, the composition is part of a final formulation at about 1% to about 4% by weight of the final formulation. In certain embodiments, the composition is part of a final formulation at about 0.5% by weight of the final formulation. In certain embodiments, the composition is part of a final formulation at about 1% by weight of the final formulation. In certain embodiments, the composition is part of a final formulation at about 3% by weight of the final formulation. In certain embodiments, the composition is part of a final formulation at about 5% by weight of the final formulation. In certain embodiments, the composition is part of a final formulation at about 0.5% to about 10% of the final formulation. In certain embodiments, the composition is part of a final formulation at about 1.5% of the final formulation. In certain embodiments, the composition is part of a final formulation at about 2.0% of the final formulation. In certain embodiments, the composition is part of a final formulation at about 2.5% of the final formulation. In certain embodiments, the composition is part of a final formulation at about 3.0% of the final formulation. In certain embodiments, the composition is part of a final formulation at about 3.5% of the final formulation.

In certain embodiments, the *Pterocarpus marsupium* bark extract is part of a final formulation at about 0.005% to about 0.25% by weight of the final formulation. In certain embodiments, the *Pterocarpus marsupium* bark extract is part of a final formulation at about 0.005% to about 0.05% by weight of the final formulation. In certain embodiments, the *Pterocarpus marsupium* bark extract is part of a final formulation at about 0.025% to about 0.25% by weight of the final formulation.

In certain embodiments, the glyceryl linoleate is part of a final formulation at about 0.375% to about 4.7% by weight of the final formulation. In certain embodiments, the glyceryl linoleate is part of a final formulation at about 0.375% to about 3.75% by weight of the final formulation. In certain embodiments, the glyceryl linoleate is part of a final formulation at about 0.47% to about 4.7% by weight of the final formulation.

In certain embodiments, the glyceryl linolenate is part of a final formulation at about 0.025% to about 0.5% by weight of the final formulation. In certain embodiments, the glyceryl linolenate is part of a final formulation at about 0.025% to about 0.25% by weight of the final formulation. In certain embodiments, the glyceryl linolenate is part of a final formulation at about 0.05% to about 0.5% by weight of the final formulation.

In certain embodiments, the xymenynic acid is part of a final formulation at about 0.025% to about 0.5% by weight of the final formulation. In certain embodiments, the xymenynic acid is part of a final formulation at about 0.025% to about 0.25% by weight of the final formulation. In certain embodiments, the xymenynic acid is part of a final formulation at about 0.05% to about 0.5% by weight of the final formulation.

In certain embodiments, the composition is part of a final formulation at about 4 µg/ml to about 500 µg/ml of the final formulation. In certain embodiments, the composition is part of a final formulation at about 4 µg/ml of the final formulation. In certain embodiments, the composition is part of a final formulation at about 20 µg/ml of the final formulation. In certain embodiments, the composition is part of a final formulation at about 100 µg/ml of the final formulation. In certain embodiments, the composition is part of a final formulation at about 200 µg/ml of the final formulation. In certain embodiments, the composition is part of a final formulation at about 500 µg/ml of the final formulation.

In certain embodiments, the final formulation is selected from the group consisting of neck cream, neck lotion, body lotion, body cream, face lotion, face cream, eye lash treatment, hair moisturizer, hair conditioner, hair and scalp oil, cellulite treatment, nail conditioner, gel, emulsion, silicone gel, water gel, oil-in-water emulsion, or water-in-oil emulsion.

In some embodiments, the pharmaceutically or cosmetically acceptable excipient is a solvent. In some embodiments, the solvent is selected from the group consisting of pentylene glycol, butylene glycol, water, glycols, propylene glycol, isopropylene glycol, coco-caprylate/caprate, 1,2-hexanediol, glycerin, cetyl alcohol and combinations thereof. In some embodiments, the pharmaceutically or cosmetically acceptable excipient is selected from the group consisting of diluents, fillers, disintegrants, binders, lubricants, surfactants, hydrophobic vehicles, water soluble vehicles, emulsifiers, buffers, humectants, moisturizers, solubilizers, preservatives, colorants, plasticizers, carriers, excipients, and combinations thereof. The person of ordinary skill in the art can refer to various pharmacologic references such as, for example, Modern Pharmaceutics, Banker & Rhodes, Marcel Dekker, Inc. (1979) and Goodman & Gilman's The Pharmaceutical Basis of Therapeutics, 6th Edition, MacMillan Publishing Co, New York (1980) for guidance in determining the amount of such components in the compositions embodiments.

Compounds, Hydroxystearic Acid (12-HSA, 10-HSA) and Octadecenedioic Acid (ODA), used to activate PPAR transcription, are waxy solid materials and exhibit formulation and compounding challenges/limitations at efficacious use levels. These ingredients, 12-HAS, 10-HAS, and ODA, increase the final product viscosity to a heavy paste-like structure with poor spreading which is not aesthetically and sensorially pleasing for end-use consumer products. Advantageously the topical composition described herein is a liquid ingredient blend with a highly-preferred sensorial profile. The topical composition described herein can be easily formulated into a wide range of final product viscosities and compositions while offering good spreading, bioavailability and rapid absorption.

In some embodiments, the topical composition further comprises a pharmaceutical or cosmetic active ingredient. In some embodiments, the pharmaceutical or cosmetic active ingredient is selected from the group consisting of vitamins, cosmetic peptides, oil control agents, sensation modifying agents, skin lightening agents, hydrating formulations, sunblock agents, a compounds that absorbs or reflects UV photons, other skin care agents, and combinations thereof. In some embodiments, the pharmaceutical or cosmetic active ingredient is selected from the group consisting of hydroxyacetophenone, sodium phytate, caprylic/capric triglyceride, sodium acrylates copolymer, octyldodecanol, octyldodecyl xyloside, PEG-30 dipolyhydroxystearate, Jojoba esters, *Helianthus annuus* (sunflower) seed wax, *Acacia decurrens* flower wax, polyglycerin-3, acrylamide/sodium acryloyldimethyl taurate copolymer, isohexadecane, polysorbate 80, cyclopentasiloxane, dimethicone, dimethicone/bis-isobutyl PPG 20 crosspolymer, dimethicone/vinyl dimethicone crosspolymer, ethylhexylglycerin, magnesium sulfate heptahydrate, isononyl isononanoate, polyglyceryl-2 dipolyhydroxystearate, *Butyrospermum parkii* (Shea) Butter, hexyl laurate, triethylhexanoin, *Cocos Nucifera* (Coconut) Oil, bisabolol, tetrahexyldecyl ascorbate, sodium benzoate, niacinamide, sodium PCA, glyceryl stearate, PEG-75 stearate, ceteth-20, steareth-20, squalane, behenyl alcohol, caprooyl phytosphingosine, adenosine, xanthan gum, lecithin, sclerotium gum, pullulan, polyacrylate-13, polyisobutene, polysorbate 20, phenoxyethanol, ethylhexylglycerin, tetrapeptide-2,1 and combinations thereof.

In some embodiments, the pharmaceutically or cosmetically acceptable excipient, the pharmaceutical or cosmetic active ingredient, or any combination thereof is present in the topical formulation described herein in an amount selected from the group consisting of about 10% to about 99.5% w/w, about 10% to about 97% w/w, about 10% to about 95% w/w, about 10% to about 90% w/w, about 10% to about 85% w/w, about 10% to about 80% w/w, about 10% to about 75% w/w, about 10% to about 70% w/w, about 10% to about 65% w/w, about 10% to about 60% w/w, about 10% to about 55% w/w, about 10% to about 50% w/w, about 10% to about 45% w/w, about 10% to about 40% w/w about 10% to about 35% w/w, about 10% to about 30% w/w, and about 10% to about 25% w/w. In some embodiments, the pharmaceutically or cosmetically acceptable excipient, pharmaceutical or cosmetic active ingredient, or any combination thereof is present in the topical formulation described herein in an amount selected from the group consisting of about 99.5% to about 95.0% w/w, about 99.5% to about 90.0% w/w, about 99.5% w/w, about 97.0% w/w, about 95.0% w/w, and about 90% w/w.

In some embodiments, the topical formulation may comprise water in a percentage selected from the group consisting of about 50% to about 90% w/w, about 60% to about 90% w/w, about 70% to about 90% w/w, and about 80% to about 90% w/w.

In some embodiments, the topical formulation may further comprise abrasives, antiacne agents, antidandruff agents, antifungal agents, antimicrobial agents, antioxidants, toners, moisturizers, skin conditioning agents, humectants, emollients, occlusive agents, skin bleaching or lightening agents, proteins, cleaners, hair conditioners, preservatives, film forming polymers, and the like.

Abrasives may be used to remove unwanted skin such as dead skin cells and calluses. In some embodiments, the abrasive is selected from the group consisting of alumina, aluminum silicate, apricot seed powder, attapulgite, avocado powder, bamboo powder, barley flour, bentonite, calcium carbonate, calcium phosphate, calcium pyrophosphate, calcium sulfate, chalk, chitin, coconut shell powder, colloidal oatmeal, comfrey leaf powder, corn cob meal or powder, corn flour, corn meal, corn starch, diamond powder, diatomaceous earth, dicalcium phosphate, dicalcium phosphate dehydrate, egg shell powder, Fuller's earth, hydrated silica, hydroxyapatite, kaolin, kiwi seed, lauryl acrylate polymers, loess, magnesium potassium fluorosilicate, magnesium trisilicate, microcrystalline cellulose, montmorillonite, Moroccan lava clay, oat bran, oat flour, oatmeal, oyster shell powder, peach pit powder, peanut flour, pecan shell powder, polyethylene, pumice, raspberry seed, rice bran, rye flour, sand, silica, sodium bicarbonate, sodium hydroxypropyl starch phosphate, sodium magnesium fluorosilicate, sodium silicoaluminate, soybean flour, sweet almond meal, talc, tin oxide, tricalcium phosphate, walnut shell powder, wheat bran, wheat flour, wheat powder, wheat starch, wood powder, zirconium silicate, and derivatives and combinations thereof.

Antiacne agents may be used to treat blemishes, pimples, blackheads, and whiteheads. In some embodiments, the antiacne agent is selected from the group consisting of salicylic acid, benzoyl peroxide, carbamide peroxide, glycolic acid, retinal, retinol, retinaldehyde, vitamin A, vitamin A derivative, azelaic acid, or sulfur, and their derivatives and combinations thereof.

Antidandruff agents may be used to treat dandruff, seborrheic dermatitis, or psoriasis. In some embodiments, the antidandruff agent is selected from the group consisting of coal tar, salicylic acid, selenium sulfide, sulfur, zinc pyrithione, and their derivatives and combinations thereof.

Antifungal agents include agents that inhibit the growth and reproduction of fungal cells or decreases the number of fungi present. In some embodiments, the antifungal agent is selected from the group consisting of calcium undecylenate, ketoconazol, povidone-iodine (PVP-iodine), tea tree oil, undecylenic acid, zinc undecylenate, and their derivatives and combinations thereof.

Antimicrobial agents include agents that kill microorganisms, prevent or inhibit microorganism growth and reproduction, or agents that help prevent infection in minor cuts, scrapes, and burns. In some embodiments, the antimicrobial agent is selected from the group consisting of lower chain (C1-C4) alcohols, quaternary ammonium compounds such as benzalkonium chloride and benzethonium chloride, clindamycin, methylbenzethonium chloride, hydrogen peroxide, Oligopeptide-10, phenols, tea tree oil, triclosan, povidone-iodine (PVP-Iodine), and their derivatives and combinations thereof.

Antioxidants include agents that are characterized as free radical scavengers and help reverse skin damage caused by free radicals. In some embodiments, the antioxidant is selected from the group consisting of acetyl cysteine, alpha lipoic acid, arbutin, ascorbic acid (vitamin C), ascorbic acid polypeptide, ascorbyl dipalmitate, ascorbyl methylsilanol pectinate, ascorbyl palmitate, ascorbyl stearate, BHA, BHT, t-butyl hydroquinone, caffeic acid, *Camellia sinensis* oil, carotenoids, chitosan ascorbate, chitosan glycolate, chitosan salicylate, chlorogenic acids, CoQ10, cortisen, cysteine, cysteine HCl, decyl mercaptomethylimidazole, diamylhydroquinone, di-t-butylhydroquinone, dicetyl thiodipropionate, dicyclopentadiene/t-butylcresol copolymer, digalloyl trioleate, dilauryl thiodipropionate, dimyristyl thiodipropionate, dioleyl tocopheryl methylsilanol, diosmine, disodium ascorbyl sulfate, disodium rutinyl disulfate, distearyl thiodipropionate, ditridecyl thiodipropionate, dodecyl gallate, dunaliella salina extract, erythorbic acid, ethyl ferulate, ferulic acid, hydroquinone, p-hydroxyanisole, hydroxylamine HCl, hydroxylamine sulfate, hydroxytyrosol, isooctyl thioglycolate, isoquercitrin, kojic acid, madecassicoside, magnesium ascorbate, magnesium ascorbyl phosphate, melatonin, methoxy-PEG-7 rutinyl succinate, methylene di-t-butylcresol, methylsilanol ascorbate, nordihydroguaiaretic acid, octyl gallate, phenylthioglycloic acid, phloroglucinol, potassium ascorbyl tocopheryl phosphate, potassium sulfite, propyl gallate, resveratrol, rosmarinic acid, rutin, sirtunis, sodium ascorbate, sodium ascorbyl/cholesteryl phosphate, sodium bisulfite, sodium erythorbate, sodium metabisulfite, sodium sulfite, sodium thioglycolate, sorbityl furfural, tea tree oil, tetrahexyldecyl ascorbate, tetrahydrodiferuloylmethane, thiodiglycol, thiodiglycolamide, thiodiglycolic acid, thioglycolic acid, thiolactic acid, thiosalicylic acid, thiotaurine, tocophereth derivatives, tocopherol (vitamin E), tocophersolan, tocopheryl acetate, tocopheryl linoleate, tocopherol linoleate/oleate, tocopheryl nicotinate, tocopheryl succinate, tocoquinone, o-tolyl biguanide, tri(nonylphenyl)phosphate, ubiquinone, vitamin D, zinc dibutyldithiocarbamate, and their derivatives and combinations thereof.

Toners include agents that create a tightening or tingling sensation on skin. In some embodiments, the toner is selected from the group consisting of ammonium alum, calcium chloride, calcium lactate, dimethyl MEA, gallic acid, lens esculenta (lentil) seed extract, potassium alum, sodium alum, sodium aluminum chlorohydroxy lactate, sodium aluminum lactate, tannic acid, tioxolone, tranexamic acid, zinc acetate, zinc chloride, zinc lactate, zinc phenolsulfonate, zinc sulfate, zirconium chlorohydrate, witch hazel, alcohol derivatives such as denatured alcohol and SD alcohol, aluminum derivatives such as aluminum acetate, aluminum bromohydrate, aluminum chloride, aluminum chlorohydrex, aluminum citrate, aluminum diacetate, aluminum dichlorohydrate, aluminum dichlorohydrex, aluminum glycinate, aluminum lactate, aluminum phenolsulfonate, aluminum sesquichlorohydrate, aluminum sesquichlorohydrex, and aluminum sulfate, aluminum zirconium derivatives such as aluminum zirconium octachlorohydrex, aluminum zirconium pentachlorohydrate, aluminum zirconium pentachlorohydrex, aluminum zirconium tetrachlorohydrate, aluminum zirconium tetrachlorohydrex, aluminum zirconium trichlorhydrate, and aluminum zirconium trichlorohydrex, and their derivatives and combinations thereof.

Skin conditioning agents or moisturizers can be classified into different groups such as emollients, humectants, and occlusive agents. Emollients include agents that remain on the upper layers of skin and act as lubricants and improve appearance. In some embodiments, the emollient is selected from the group consisting of petrolatum, petrolatum plus volatile silicones, cold cream (USP), hydrophilic ointment (USP), lanolin, glycerides, fruit oils, nut oils, vegetable oils, dimethicones, methicone, cyclomethicone, dormin, fatty acids, myristate derivatives like butyl myristate and myristyl myristate, oleate derivates, C1-C4 glycols, fatty acid glycols, glycol esters, glycerine, glycerols, paraffin, rapeseed oil, long chain alcohols, olive oil, jojoba oil, castor oil, and their derivatives and combinations thereof. Humectants include agents that increase the water content of the top layer of skin. In some embodiments, the humectant is selected from the group consisting of allatoin, agarose, arginine, benzyl hyaluronate, chitosan, copper, corn glycerides, gluconolactone, lactic acid, lactobionic acid, lactose, lysine, kombucha, maltitol, maltose, mannitol, propylene glycol, butylene glycol, pentylene glycol, propanediol, sodium aspartate, fructose, honey, glycerin, diglycerin, betaine, diols, hydroxyethyl urea, 1,2-hexanediol, D-ribose, glucose, sorbitol, dextrose, urea, 2-Pyrrolidone-5-Carboxylic Acid and related salts, sea salt, inorganic salts of citric acid, inorganic salts of lactic acid, ectoin, glycolic acid, and their derivatives and combinations thereof. Occlusive agents slow the evaporation of water from skin. In some embodiments, the occlusive agent is selected from the group consisting of petrolatum, shea butter, dimethicones, plant and animal oils such as avocado, canola, cod liver, and corn, mineral oil, olive oil, soybean oil, lanolin, glycerides, beeswax, triglycerides, long chain fatty alcohols, coco butter, coconut oil, jojoba oil, propylene glycol and their derivatives and combinations thereof.

In addition to skin conditioning agents that provide a moisturizing benefit, there are other skin conditioning agents that improve the appearance of skin. In some embodiments, the skin conditioning agent is selected from the group consisting of cholesterol, cystine, hyaluronic acid, keratin, egg yolk, glycine, gluconolactone, lactic acid, lactobionic acid, panthenol, retinol, salicylic acid, vegetable oil, proteins, vitamins, bisabolol, ceramide, coenzyme A, lecithin and their derivatives and combinations thereof.

Skin bleaching or lightening agents include agents that lighten pigment in skin. The preferred skin bleaching agent is hydroquinone. In some embodiments, the brightener is selected from the group consisting of azelaic acid, bearberry, deoxyarbuten, *Glycyrrhiza glabra* (Licorice) root extract, kojic acid, peat extract, and their derivatives and combinations thereof.

Hair conditioners include agents that enhance the appearance and feel of hair by improving a property like gloss, texture, or body. In some embodiments, the hair conditions is selected from the group consisting of lanolin, silicone, dimethicone, proteins such as amino acids, collagen, and keratin, vitamins, betaine surfactants, amine oxide surfactants, ceramide, fatty acids, eggs, milk, natural plant and animal oils, mineral oil, olive oil, polyquaternium, and their derivatives and combinations thereof.

Proteins include animal, plant, fungi, yeast, and bacteria proteins that have skin health benefits. In some embodiments, the protein is selected from the group consisting of collagen, keratin, soy protein, wheat protein, bean palmitate, ascorbic acid polypeptide, the amino acids, casein, cholecalciferol polypeptide, rice protein, silk protein, gluten protein, lysine, acetyl glucosamine, actin, actizyme, albumen, conchiorin protein, corn protein, egg protein, elastin, fibronectin, gadidae protein, hemoglobin, hexapeptide-21, lactalalbumin, lupine protein, maple sycamore protein, milk protein, myristoyl pentapeptide-8, myristoyl tetrapeptide-8, oat protein, oligopeptide 10, palmitoyl hexapeptide-14, palmitoyl oligopeptide, palmitoyl tetrapeptide-7, pea protein, potato protein, reticulin, rice bran protein, serum protein, sweet almond protein, tetrapeptide-16, vegetable protein, yeast protein, palmitoyl oligopeptide, pantothenic acid polypeptides, milk solids, sericin, albumen, amylase, amyloglucosidase, arginine, bromelain, catalase, gelatin, zein, crystallins, cytochrome C, deoxyribonuclease, gliadin, glucose oxidase, glycoproteins, lactoferrin, lactoglubulin, lactoperoxidase, lipase, nisin, oxido reductases, papain, pepsin, subtilisin, sutilains, and their derivatives and combinations thereof.

Cleansers include agents that are used for cleaning the skin and hair by solubilizing oil and suspending soils. Cleansers may be foaming or non-foaming. Exemplary cleaners are typically a surfactant and can be characterized as nonionic, anionic, or zwitterionic. In some embodiments, the cleanser is selected from the group consisting of taurates, sulfates, sulfonates, carboxylates, sulfosuccinates, sarcosinates, zwitterionic betaines, fatty acid and fatty alcohol derivatives, and alkylpolyglucoside and amine oxide surfactants. In some embodiments, the cleansers may be combined with some abrasives such as clays and sulfurs to provide light exfoliation.

In some embodiments, the topical formulation further comprises a gelling agent. In some embodiments, the gelling agent is a water phase gelling agent. In some embodiments, the water phase gelling agent is selected from the group consisting of xanthan gum, gellan gum, carrageenan, biosaccharide gum-I, sclerotium gum, pectin, pullulan, guar gum, gum arabic, chondroitin, sulfate, alginic acid, sodium hyaluronate, hydrolyzed hyaluronic acid sodium polyglutamate, chitin, chitosan, starch, and combinations thereof. In some embodiments, the gelling agent is xanthan gum.

In some embodiments, the topical formulation may further comprise an oil control agents. Oil control agents are compounds useful for regulating the production of skin oil, or sebum, and for improving the appearance of oily skin. In some embodiments, the oil control agent is selected from the group consisting of salicylic acid, dehydroacetic acid, benzoyl peroxide, vitamin B3 (for example, niacinamide), and the like, their isomers, esters, salts and derivatives, and combinations thereof.

In some embodiments, the topical formulation may further comprise other skin care agents selected from the group consisting of retinol, steroids, sunblock, salicylate, minocycline, antifungals, peptides, antibodies, lidocaine, and the like and combinations thereof. In some embodiments, other skin care agents include N-acyl amino acid compounds comprising, for example, N-acyl phenylalanine, N-acyl tyrosine, and the like, their isomers, comprising their D and L isomers, salts, derivatives, and mixtures thereof. An example of a suitable N-acyl amino acid is N-undecylenoyl-L-phenylalanine is commercially available under the tradename SEPIWHITE®. Other skin active agents include, but are not limited to, Lavandox, Thallasine 2, Argireline NP, Gatuline In-Tense and Gatuline Expression, Myoxinol LS 9736, Syn-ake, and Instensyl®, Sesaflash™, N-acetyl D-glucosamine, panthenol (for example, DL panthenol available from Alps Pharmaceutical Inc.), tocopheryl nicotinate, benzoyl peroxide, 3-hydroxy benzoic acid, flavonoids (for example, flavanone, chalcone), farnesol, phytantriol, glycolic acid, lactic acid, 4-hydroxy benzoic acid, acetyl salicylic acid, 2-hydroxybutanoic acid, 2-hydroxypentanoic acid, 2-hydroxyhexanoic acid, cis-retinoic acid, trans-retinoic acid, retinol, retinyl esters (for example, retinyl propionate), phytic acid, N-acetyl-L-cysteine, lipoic acid, tocopherol and its esters (for example, tocopheryl acetate: DL-a-tocopheryl acetate available from Eisai), azelaic acid, arachidonic acid, tetracycline, ibuprofen, naproxen, ketoprofen, hydrocortisone, acetominophen, resorcinol, phenoxyethanol, phenoxypropanol, phenoxyisopropanol, 2,4,4'-trichloro-2'-hydroxy diphenyl ether, 3,4,4'-trichlorocarbanilide, octopirox, lidocaine hydrochloride, clotrimazole, miconazole, ketoconazole, neomycin sulfate, theophylline, and mixtures thereof. Further skin care agents are disclosed in US Publication No. 2007/0020220A1, wherein the components/ingredients are incorporated herein by reference in their entirety.

In some embodiments, the topical formulation may further comprise antiaging ingredients selected from the group consisting of ascorbic acid compounds, vitamin B3 compounds, azelaic acid, butyl hydroxyanisole, gallic acid and its derivatives, glycyrrhizinic acid, hydroquinone, kojic acid, arbutin, mulberry extract, and combinations thereof. In some embodiments, the topical composition may comprise Ovaliss ((S)-5,6,6a,7-Tetrahydro-1,2,9,10-tetramethoxy-6-methyl-4H-dibenzo[de,g]quinoline, 1,2-Octanediol, D-Glucopyranose, oligomeric, C10-16-alkyl glycosides, water, ethyl alcohol, and glycerin), Whey protein, MPC (Milk protein complex), Sesaflash (Glycerin, Acrylates copolymer, PVP/polycarbamyl polyglycol ester, Hydrolyzed Sesame Protein PG-propyl methylsilanediol), Majestem (glycerin, *Leontopodium alpinum* Callus Culture Extract and xanthan gum), or Idealift (butylene glycol, sorbitan laurate, hydroxyethylcellulose, and acetyl dipeptide-1 cetyl ester).

In some embodiments, the topical formulation may further comprises sunblock agents selected from the group consisting of para-aminobenzoic acid (PABA), PABA esters (glyceryl PABA, amyldimethyl PABA and octyldimethyl PABA), benzophenones (oxybenzone and sulisobenzone), cinnamates (octylmethoxy cinnamate and cinoxate), salicylates (homomethyl salicylate) anthranilates, TiO2, avobenzone, bemotrizinol, bisoctrizole, 3-(4-methylbenzylidene)-camphor, cinoxate, diethylamino hydroxybenzoyl hexyl benzoate, dioxybenzone, drometrizole trisiloxane, ecamsule, ethylhexyl triazone, homosalate, menthyl anthranilate, octocrylene, octyl salicylate, iscotrizinol, isopentenyl-4-methoxycinnamate, octyl-dimethyl-p-aminobenzoic acid, octyl-methoxycinnamate, oxybenzone, polysilicone-15, trolamine salicylate, ZnO, and combinations thereof.

In some embodiments, the topical formulation may comprise a sensation modifying agent selected from the group of a cooling agent, a warming agent, a relaxing or soothing agent, a stimulating or refreshing agent, and combinations thereof.

In some embodiments, the cooling agent is selected from the group consisting of menthol; an isomer of menthol, a menthol derivative; 4-Methyl-3-(1-pyrrolidinyl)-2[5H]-furanone; WS-23, Icilin, Icilin Unilever Analog, 5-methyl-4-(1-pyrrolidinyl)-3-[2H]-furanone; 4,5-dimethyl-3-(1-pyrrolidinyl)-2[5H]-furanone; isopulegol, 3-(1-menthoxy)propane-1,2-diol, 3-(1-menthoxy)-2-methylpropane-1,2-diol, p-menthane-2,3-diol, p-menthane-3,8-diol, 6-isopropyl-9-methyl-1,4-dioxas-piro[4,5]decane-2-methanol, menthyl succinate and its alkaline earth metal salts, trimethylcyclohexanol, N-ethyl-2-isopropyl-5-methylcyclohexanecarb-oxamide, Japanese mint (*Mentha arvensis*) oil, peppermint oil, menthone, menthone glycerol ketal, menthyl lactate, 3-(1-menthoxy)ethan-1-ol, 3-(1-menthoxy)propan-1-ol, 3-(1-menthoxy)butan-1-ol, 1-menthylacetic acid N-ethylamide, 1-menthyl-4-hydroxypentanoate, 1-menthyl-3-hydroxybutyrate, N,2,3-trimethyl-2-(1-methylethyl)-butanamide, spearmint oil and combination thereof.

In some embodiments, the warming agent is selected from the group consisting of polyhydric alcohols, capsaicin, capsicum powder, a capsicum tincture, capsicum extract, capsaicin, hamamalis, homocapsaicin, homodihydrocapsaicin, nonanoyl vanillyl amide, nonanoic acid vanillyl ether, vanillyl alcohol alkyl ether derivatives, such as vanillyl ethyl ether, vanillyl butyl ether, vanillyl pentyl ether, and vanillyl hexyl ether, isovanillyl alcohol alkyl ethers, ethylvanillyl alcohol alkyl ethers, veratryl alcohol derivatives, substituted benzyl alcohol derivatives, substituted benzyl alcohol alkyl ethers, vanillin propylene glycol acetal, ethylvanillin propylene glycol acetal, ginger extract, ginger oil, gingeol, gingeron, and combination thereof.

In some embodiments, the relaxing or soothing agent is selected from the group consisting of herb extracts, aloe vera, alpha bisabolol, D-panthenol, allantoin, hamamelis, chamomile, yarrow; calendula, comfrey, witch hazel and other astringents, sea weed, and oat extracts; oils, selected from the group consisting of: almond oil, avocado oil, and comfrey; and essential oils, selected from the group consisting of: cardamone, eucalyptus, *Mentha piperita* (peppermint), hyssop, and rosemary; waxy or unctuous substances selected from the group consisting of: lanolin or vaseline jelly, minerals, selected from the group consisting of: zinc oxide, calamine and selenium; vitamins, selected from the group consisting of: tocopheryl acetate (vitamin E), and pharmaceutical agents selected from the group consisting of: analgesics, anesthetics, anti-inflammatory agents, and antihistamines, and muscle relaxants; menthol, camphor, eugenol, eucalyptol, safrol, methyl salicylate, menthyl lactate, menthyl ethoxyacetate, menthone glycerinacetal, 3-1-menthoxypropane-1,2-diol, ethyl 1-menthyl carbonate, (1S,3S,4R)-p-menth-8-en-3-ol, menthyl pyrrolidone carboxylate, N-substituted-p-menthane-3-carboxamides hamamelis extract, ginger oil, and combination thereof.

In some embodiments, the stimulating or refreshing agent is selected from the group consisting of alcohol, L-menthol, camphor, menthe oil, capsicum extract, capsaicin, benzyl nicotinate, salicylate, glycol salicylate, acetyl choline, serotonin, histamine, a prostaglandin, a neurotransmitter, a CNS stimulant, caffeine, quinine, and combination thereof.

In some embodiments, the topical formulation has a pH of less than about 6.0. In some embodiments, the topical formulation has a pH of less than about 5.5. In some embodiments, the topical formulation has a pH selected from the group consisting of about 4.0 to about 6.0, about 4.5 to about 5.0, and about 4.4 to about 4.7.

In certain embodiments, the topical formulation is formulated in a form selected from the group consisting of solution, fluid, emulsion, suspension, solid, semi-solid, jelly, paste, gel, hydrogel, ointment, lotion, cream, foam, mousse, liquid, spray, suspension, dispersion, powder, aerosol, film, or transdermal patches formulated as a liquid, cream, ointment, gel, aerosol, neck cream, neck lotion, body lotion, body cream, face lotion, face cream, eye lash treatment, hair moisturizer, hair conditioner, hair and scalp oil, cellulite treatment, nail conditioner, gel, emulsion, silicone gel, water gel, oil-in-water emulsion, or water-in-oil emulsion.

Liquid dosage forms for topical administration may comprise diluents such as, for example, alcohols, glycols, oils, water, and the like. Such compositions may also include wetting agents or emulsifiers.

A cream can be a water-in-oil (w/o) emulsion in which an aqueous phase is dispersed in an oil phase, or an oil-in-water (o/w) emulsion in which an oil is dispersed within an aqueous base. An ointment generally refers to a more viscous oil-in-water cream. Traditional ointment bases (i.e. carrier) include hydrocarbons (petrolatum, beeswax, etc.) vegetable oils, fatty alcohols (cholesterol, lanolin, wool alcohol, stearyl alcohol, etc.) or silicones. Insoluble solids such as starch, zinc oxide, calcium carbonate, or talc can also be used in ointments and creams. Gel forms of the compositions described above can be formed by the entrapment of large amounts of aqueous or aqueous-alcoholic liquids in a network of polymers or of colloidal solid particles. Such polymers or colloids (gelling or thickening agents) are typically present at concentrations of less than 10% w/w and include carboxymethyl cellulose, hydroxypropylmethyl cellulose, hydroxyethyl cellulose, methyl cellulose, sodium alginate, alginic acid, pectin, tragacanth, carrageen, agar, clays, aluminum silicate, carbomers, and the like.

In aerosols the composition is dissolved in a propellant such as dichlorodifluoromethane, trichlorofluoromethane, dichlorotetrafluoroethane, carbon dioxide, or other suitable gas, and a co-solvent such ethanol, acetone, hexadecyl alcohol, and combinations thereof.

Hydrogels are typically prepared by cross-linking various monomers and/or polymers to provide a three-dimensional polymer network. Non-limiting examples of polymers include, polyoxyethylene-polypropylene block copolymers, ionic poly saccharides, such as chitosan or sodium alginate, cellulose, and biodegradable polymers, such as poly-lactides (PLA) and poly-glycolides (PGA), butylene succinate (PBS), polyhydroxyalkanoate (PHA), polycaprolactone acid lactone (PCL), polyhydroxybutyrate (PHB), glycolic amyl (PHV), PHB and PHV copolymer (PHBV), and poly lactic acid (PLA)-polyethylene glycol (PEG) copolymers (PLEG).

The transdermal patches can be in any conventional form such as, for example, a strip, a gauze, a film, and the like. Patch material may be nonwoven or woven (e.g., gauze dressing). Layers may also be laminated during processing. It may be nonocclusive or occlusive, but the latter is preferred for backing layers. The patch is preferably hermetically sealed for storage (e.g., foil packaging). The patch can be held onto the skin and components of the patch can be held together using various adhesives. For example, the transdermal patch can be in the form of a Band-Aid type device, or it may be packaged in a small metal or plastic "cup", which is strapped onto the appropriate site using an adhesive, tape, or an outer fabric or leather strap, similar to that worn as part of a watch. The entire patch may be disposable or may be refillable. In embodiments, the composition can be formulated with a latex polymer, wherein the composition is applied to the skin and forms an occlusive film.

In some embodiments, the topical formulation disclosed herein can be coated on bandages, mixed with bio adhesives, or included in dressings.

In some embodiments, the topical formulation disclosed herein can be used in combination with a cosmetic device.

In some embodiments, the topical formulation disclosed herein can be used in combination with a patch.

In some embodiments, the topical formulation is part of an anti-aging regimen. In some embodiments, the topical formulation is part of regimen for after sun care. In some embodiments, the topical formulation is part of a photoprotective regimen. In some embodiments, the photoprotective regimen is a sunblock regimen or a sunscreen. In some embodiments, the topical formulation is part of regimen for skin lightening. In some embodiments, the topical formulation is part of regimen for skin brightening. In some embodiments, the topical formulation is part of regimen for acne treatment. In some embodiments, the topical formulation is part of regimen for inflammation treatment. In some embodiments, the topical formulation is part of a color cosmetic regimen. In some embodiments, the topical formulation is part of a hair treatment regimen. In some embodiments, the topical formulation is part of a scalp treatment regimen.

Methods of Using Compositions Described Herein

Embodiments disclosed herein are directed to methods of inducing skin barrier repair comprising topically administering a topical formulation comprising a composition having an effective amount of three or more PPAR agonists selected from the group consisting of glyceryl linoleate, glyceryl linolenate, xymenynic acid, and *Pterocarpus marsupium* bark extract, and pharmaceutically or cosmetically acceptable excipients, wherein the topical formulation is suitable for topical administration.

Embodiments disclosed herein are directed to methods of inducing skin barrier repair comprising topically administering a topical formulation comprising a composition of an effective amount of the following PPAR agonists: glyceryl linoleate, glyceryl linolenate, xymenynic acid, and *Pterocarpus marsupium* bark extract, and pharmaceutically or cosmetically acceptable excipients, wherein the topical formulation is suitable for topical administration.

In certain embodiments, the inducing skin barrier repair results in the biosynthesis of barrier lipids and proteins in the skin selected from the group consisting of ceramides, filaggrin, trans-glutaminase 1, TGFB1, keratins, LCE1D, CERS3, CDH1, FOXO1, HSP27, involucrin, loricrin, beta-glucocerebrosidase, aquaporin 3, ABCA12, ADRP, FIAF, and combinations thereof. In certain embodiments, the inducing skin barrier repair results in the modulation of the expression of barrier genes in the skin selected from the group consisting of ceramides, filaggrin, trans-glutaminase 1, TGFB1, keratins, LCE1D, CERS3, CDH1, FOXO1, HSP27, involucrin, loricrin, beta-glucocerebrosidase, aquaporin 3, ABCA12, ADRP, FIAF, and combinations thereof.

In certain embodiments, ceramide expression is increased. Ceramides are lipid component of the lipid bilayer; in addition to providing structural support to the cell, ceramides participate in a variety of cellular signaling, such as regulating differentiation, proliferation, and programmed cell death (PCD) of cells. In some embodiments, the ceramide is CERS3, a ceramide synthase. In certain embodiments, ceramide expression remains constant and does not decrease.

In certain embodiments, filaggrin expression is increased. Filaggrin is a filament-associated protein that binds to keratin fibers in epithelial cells. In certain embodiments, filaggrin expression remains constant and does not decrease.

In certain embodiments, trans-glutaminase 1 (TGM1) expression is increased. TGM1 encodes a keratinocyte transglutaminase enzyme. In certain embodiments, TGM1 expression remains constant and does not decrease.

In certain embodiments, TGFB1 expression is increased. TGFB1 (Transforming growth factor beta 1 or TGF-β1) is a cytokine and is a master regulator of skin anti-aging processes and wound healing. In certain embodiments, TGFB1 expression remains constant and does not decrease.

In certain embodiments, the expression of keratins is modulated. Keratins are fibrous structural proteins known as scleroproteins. In certain embodiments, KRT1 is decreased. In certain embodiments, KRT5 is increased. In certain embodiments, KRT6B is increased. In certain embodiments, KRT17 is decreased.

In certain embodiments, LCE1D expression is increased. LCE1D is a late cornified protein and is a precursor of the cornified envelope of the stratum corneum. In certain embodiments, LCE1D expression remains constant and does not decrease.

In certain embodiments, CDH1 expression is increased. CDH1 is an e-cadherin Ca(2+)-dependent cell-cell adhesion molecule. In certain embodiments, CDH1 expression remains constant and does not decrease.

In certain embodiments, FOXO1 expression is increased. FOXO1 is a keratinocyte-differentiating molecule. In certain embodiments, FOXO1 expression remains constant and does not decrease.

In certain embodiments, aquaporin 3 (AQP3) expression is increased. AQP3 is a membrane transporter of water and glycerol expressed in plasma membranes in the basal layer keratinocytes of epidermis. In certain embodiments, AQP3 expression remains constant and does not decrease.

In certain embodiments, involucrin and loricrin expression are increased. Involucrin is a protein component of human skin and in humans is encoded by the IVL gene. In binding the protein loricrin, involucrin contributes to the formation of a cell envelope that protects corneocytes in the skin. In certain embodiments, involucrin and loricrin expression remains constant and do not decrease.

In certain embodiments, HSP27 expression is increased. Heat-shock protein 27 (Hsp27) is a member of the small Hsp family that functions as molecular chaperones and protects cells against environmental stress. Hsp27 is expressed in the upper epidermal layers of normal human skin and has been reported to play a role in keratinocyte differentiation and apoptosis. In certain embodiments, HSP27 expression remains constant and does not decrease.

In certain embodiments, beta-glucocerebrosidase expression is increased. β-Glucocerebrosidase (also called acid β-glucosidase, D-glucosyl-N-acylsphingosine glucohydrolase, or GCase) is an enzyme with glucosylceramidase activity that is needed to cleave, by hydrolysis, the beta-glucosidic linkage of the chemical glucocerebroside, an intermediate in glycolipid metabolism that is abundant in cell membranes (particularly skin cells). In certain embodiments, beta-glucocerebrosidase expression remains constant and does not decrease.

In certain embodiments, ABCA12 expression is increased. ABCA12 belongs to a group of genes called the ATP-binding cassette family, which makes proteins that transport molecules across cell membranes. This protein appears to be essential for normal development of the skin, which provides a barrier between the body and its surrounding environment. It transports epidermoside, a glucosylceramide, out of the keratinocytes of the stratum corneum of the epidermis. In certain embodiments, ABCA12 expression remains constant and does not decrease.

In certain embodiments, an increase in expression refers to the increase in the gene expression and an increase in the encoded protein. In certain embodiments, a decrease in expression refers to the decrease in the gene expression and a decrease in the encoded protein. In certain embodiments, the gene expression is measured by isolating the RNA of interest, performing qPCR, quantifying levels of expression compared with a housekeeping gene or compared with a control sample. In certain embodiments, the protein expression is measured by Western blot analysis, wherein the protein of interest is identified and quantified using an appropriate antibody compared with a housekeeping protein or compared with a control sample.

Embodiments disclosed herein are directed to methods of improving skin barrier function comprising topically administering a topical formulation comprising a composition having an effective amount of three or more PPAR agonists selected from the group consisting of glyceryl linoleate, glyceryl linolenate, xymenynic acid, and *Pterocarpus marsupium* bark extract, and pharmaceutically or cosmetically acceptable excipients, wherein the topical formulation is suitable for topical administration.

Embodiments are directed to methods of improving skin barrier function comprising topically administering a topical formulation comprising a composition of an effective amount of the following PPAR agonists: glyceryl linoleate, glyceryl linolenate, xymenynic acid, and *Pterocarpus marsupium* bark extract, and pharmaceutically or cosmetically acceptable excipients, wherein the topical formulation is suitable for topical administration.

Embodiments disclosed herein are directed to methods of improving skin surface texture comprising topically administering a topical formulation comprising a composition having an effective amount of three or more PPAR agonists selected from the group consisting of glyceryl linoleate, glyceryl linolenate, xymenynic acid, and *Pterocarpus marsupium* bark extract, and pharmaceutically or cosmetically acceptable excipients, wherein the topical formulation is suitable for topical administration.

Embodiments are directed to methods of improving skin surface texture comprising topically administering a topical formulation comprising a composition of an effective amount of the following PPAR agonists: glyceryl linoleate, glyceryl linolenate, xymenynic acid, and *Pterocarpus marsupium* bark extract, and pharmaceutically or cosmetically acceptable excipients, wherein the topical formulation is suitable for topical administration.

Embodiments disclosed herein are directed to methods of providing desquamation comprising topically administering a topical formulation comprising a composition having an effective amount of three or more PPAR agonists selected from the group consisting of glyceryl linoleate, glyceryl linolenate, xymenynic acid, and *Pterocarpus marsupium* bark extract, and pharmaceutically or cosmetically acceptable excipients, wherein the topical formulation is suitable for topical administration.

Embodiments are directed to methods of providing desquamation comprising topically administering a topical formulation comprising a composition of an effective amount of the following PPAR agonists: glyceryl linoleate, glyceryl linolenate, xymenynic acid, and *Pterocarpus marsupium* bark extract, and pharmaceutically or cosmetically acceptable excipients, wherein the topical formulation is suitable for topical administration.

Embodiments disclosed herein are directed to methods of improving skin brightening comprising topically administering a topical formulation comprising a composition having an effective amount of three or more PPAR agonists selected from the group consisting of glyceryl linoleate, glyceryl linolenate, xymenynic acid, and *Pterocarpus marsupium* bark extract, and pharmaceutically or cosmetically acceptable excipients, wherein the topical formulation is suitable for topical administration.

Embodiments are directed to methods of improving skin brightening comprising topically administering a topical formulation comprising a composition of an effective amount of the following PPAR agonists: glyceryl linoleate, glyceryl linolenate, xymenynic acid, and *Pterocarpus marsupium* bark extract, and pharmaceutically or cosmetically acceptable excipients, wherein the topical formulation is suitable for topical administration.

Embodiments disclosed herein are directed to methods of mitigating irritation comprising topically administering a topical formulation comprising a composition having an effective amount of three or more PPAR agonists selected from the group consisting of glyceryl linoleate, glyceryl linolenate, xymenynic acid, and *Pterocarpus marsupium* bark extract, and pharmaceutically or cosmetically acceptable excipients, wherein the topical formulation is suitable for topical administration.

Embodiments are directed to methods of mitigating irritation comprising topically administering a topical formulation comprising a composition of an effective amount of the following PPAR agonists: glyceryl linoleate, glyceryl linolenate, xymenynic acid, and *Pterocarpus marsupium* bark extract, and pharmaceutically or cosmetically acceptable excipients, wherein the topical formulation is suitable for topical administration.

Embodiments disclosed herein are directed to methods of supporting the skin's natural ability to defend itself against environmental stressors comprising topically administering a topical formulation comprising a composition having an effective amount of three or more PPAR agonists selected from the group consisting of glyceryl linoleate, glyceryl linolenate, xymenynic acid, and *Pterocarpus marsupium* bark extract, and pharmaceutically or cosmetically acceptable excipients, wherein the topical formulation is suitable for topical administration.

Embodiments are directed to methods of supporting the skin's natural ability to defend itself against environmental stressors comprising topically administering a topical formulation comprising a composition of an effective amount of the following PPAR agonists: glyceryl linoleate, glyceryl linolenate, xymenynic acid, and *Pterocarpus marsupium* bark extract, and pharmaceutically or cosmetically acceptable excipients, wherein the topical formulation is suitable for topical administration.

Embodiments are directed to methods of improving aging skin comprising topically administering a composition comprising a combination of three or more PPAR agonists as described herein. Embodiments disclosed herein are directed to methods of improving aging skin comprising an effective amount of three or more PPAR agonists selected from the group consisting of glyceryl linoleate, glyceryl linolenate, xymenynic acid, and *Pterocarpus marsupium* bark extract, and a pharmaceutically or cosmetically acceptable excipient. Embodiments disclosed herein are directed to methods of improving aging skin comprising an effective amount of the following PPAR agonists: glyceryl linoleate, glyceryl linolenate, xymenynic acid, and *Pterocarpus marsupium* bark extract, and a pharmaceutically or cosmetically acceptable excipient.

In certain embodiments, the improvement of aging skin is selected from the group consisting of smoothness, hydration, texture, skin tone, luminosity skin brightness and radiance, elasticity and firmness, smooth fine lines related to photodamage and aging, and relieving dry, irritated and itchy skin, and reduced transepidermal water loss (TEWL).

Embodiments disclosed herein are directed to methods of preventing skin damage comprising topically administering a topical formulation comprising a composition having an effective amount of three or more PPAR agonists selected from the group consisting of glyceryl linoleate, glyceryl linolenate, xymenynic acid, and *Pterocarpus marsupium* bark extract, and pharmaceutically or cosmetically acceptable excipients, wherein the topical formulation is suitable for topical administration.

Embodiments are directed to methods of preventing skin damage comprising topically administering a topical formulation comprising a composition of an effective amount of the following PPAR agonists: glyceryl linoleate, glyceryl linolenate, xymenynic acid, and *Pterocarpus marsupium* bark extract, and pharmaceutically or cosmetically acceptable excipients, wherein the topical formulation is suitable for topical administration.

Embodiments disclosed herein are directed to methods of improving the look of skin comprising topically administering a topical formulation comprising a composition having an effective amount of three or more PPAR agonists selected from the group consisting of glyceryl linoleate, glyceryl linolenate, xymenynic acid, and *Pterocarpus marsupium* bark extract, and pharmaceutically or cosmetically acceptable excipients, wherein the topical formulation is suitable for topical administration.

Embodiments are directed to methods of improving the look of skin comprising topically administering a topical formulation comprising a composition of an effective amount of the following PPAR agonists: glyceryl linoleate, glyceryl linolenate, xymenynic acid, and *Pterocarpus marsupium* bark extract, and pharmaceutically or cosmetically acceptable excipients, wherein the topical formulation is suitable for topical administration.

Embodiments disclosed herein are directed to methods of calming and soothing irritated skin comprising topically administering a topical formulation comprising a composition having an effective amount of three or more PPAR agonists selected from the group consisting of glyceryl linoleate, glyceryl linolenate, xymenynic acid, and *Pterocarpus marsupium* bark extract, and pharmaceutically or cosmetically acceptable excipients, wherein the topical formulation is suitable for topical administration.

Embodiments are directed to methods of calming and soothing irritated skin comprising topically administering a topical formulation comprising a composition of an effective amount of the following PPAR agonists: glyceryl linoleate, glyceryl linolenate, xymenynic acid, and *Pterocarpus marsupium* bark extract, and pharmaceutically or cosmetically acceptable excipients, wherein the topical formulation is suitable for topical administration.

In embodiments described herein, improving the look of skin is an improvement in a characteristic of the skin. In some embodiments, the characteristic of the skin is selected from the group consisting of firmness, elasticity, fine lines, wrinkles, skin texture, skin tone, appearance, and any combination thereof. In some embodiments, improving the look of the skin results in smoother, firmer, young-looking skin. In some embodiments, improving the look of the skin results in a brighter complexion, improved texture, and even-looking skin.

In embodiments described herein, improving the appearance of the skin results in smoother skin, firmer skin, softer skin, brighter complexion, improved texture of the skin, even-looking skin, improvement of discoloration, disappearance of blemishes, decreased redness, or younger-looking skin. In some embodiments, improving the appearance of the skin results in an anti-inflammatory effect. In some embodiments, improving the appearance of the skin results in an increase in elasticity of the skin, a decrease in the fine lines of the skin, a decrease in the wrinkles of the skin, a more consistent skin tone, and any combination thereof.

Embodiments disclosed herein are directed to methods of treating fibrotic skin comprising topically administering a topical formulation comprising a composition having an effective amount of three or more PPAR agonists selected from the group consisting of glyceryl linoleate, glyceryl linolenate, xymenynic acid, and *Pterocarpus marsupium* bark extract, and pharmaceutically or cosmetically acceptable excipients, wherein the topical formulation is suitable for topical administration.

Embodiments are directed to methods of treating fibrotic skin conditions comprising topically administering a topical formulation comprising a composition of an effective amount of the following PPAR agonists: glyceryl linoleate, glyceryl linolenate, xymenynic acid, and *Pterocarpus marsupium* bark extract, and pharmaceutically or cosmetically acceptable excipients, wherein the topical formulation is suitable for topical administration. In some embodiments, the fibrotic skin condition is selected from the group consisting of atopic dermatitis, eczema, scleroderma, nephrogenic fibrosing dermopathy, mixed connective tissue disease, scleromyxedema, scleroderma, eosinophilic fasciitis, and combinations thereof. In some embodiments, the fibrotic skin condition is eczema.

Embodiments disclosed herein are directed to methods of treating photo-damage and hyperpigmentation comprising topically administering a topical formulation comprising a composition having an effective amount of three or more PPAR agonists selected from the group consisting of glyceryl linoleate, glyceryl linolenate, xymenynic acid, and *Pterocarpus marsupium* bark extract, and pharmaceutically or cosmetically acceptable excipients, wherein the topical formulation is suitable for topical administration.

Embodiments are directed to methods of treating photo-damage and hyperpigmentation comprising topically administering topical formulation comprising a composition of an effective amount of the following PPAR agonists: glyceryl linoleate, glyceryl linolenate, xymenynic acid, and *Pterocarpus marsupium* bark extract, and pharmaceutically or cosmetically acceptable excipients, wherein the topical formulation is suitable for topical administration. In some embodiments, the topical formulation inhibits the activity of melanogenesis both intracellularly and extracellularly.

Embodiments disclosed herein are directed to methods of stimulating hair growth comprising topically administering a topical formulation comprising a composition having an effective amount of three or more PPAR agonists selected from the group consisting of glyceryl linoleate, glyceryl linolenate, xymenynic acid, and *Pterocarpus marsupium* bark extract, and pharmaceutically or cosmetically acceptable excipients, wherein the topical formulation is suitable for topical administration.

Embodiments are directed to methods of stimulating hair growth comprising topically administering a topical formulation comprising a composition of an effective amount of the following PPAR agonists: glyceryl linoleate, glyceryl linolenate, xymenynic acid, and *Pterocarpus marsupium* bark extract, and pharmaceutically or cosmetically acceptable excipients, wherein the topical formulation is suitable for topical administration.

Embodiments disclosed herein are directed to methods of maintaining healthy hair comprising topically administering a topical formulation comprising a composition having an effective amount of three or more PPAR agonists selected from the group consisting of glyceryl linoleate, glyceryl linolenate, xymenynic acid, and *Pterocarpus marsupium* bark extract, and pharmaceutically or cosmetically acceptable excipients, wherein the topical formulation is suitable for topical administration.

Embodiments are directed to methods of maintaining healthy hair comprising topically administering a topical formulation comprising a composition of an effective amount of the following PPAR agonists: glyceryl linoleate, glyceryl linolenate, xymenynic acid, and *Pterocarpus mar-*

*supium* bark extract, and pharmaceutically or cosmetically acceptable excipients, wherein the topical formulation is suitable for topical administration.

Embodiments disclosed herein are directed to methods of increasing hair density and volume comprising topically administering a topical formulation comprising a composition having an effective amount of three or more PPAR agonists selected from the group consisting of glyceryl linoleate, glyceryl linolenate, xymenynic acid, and *Pterocarpus marsupium* bark extract, and pharmaceutically or cosmetically acceptable excipients, wherein the topical formulation is suitable for topical administration.

Embodiments are directed to methods of increasing hair density and volume comprising topically administering a topical formulation comprising a composition of an effective amount of the following PPAR agonists: glyceryl linoleate, glyceryl linolenate, xymenynic acid, and *Pterocarpus marsupium* bark extract, and pharmaceutically or cosmetically acceptable excipients, wherein the topical formulation is suitable for topical administration.

Embodiments disclosed herein are directed to methods of improving the look and feel of hair comprising topically administering a topical formulation comprising a composition having an effective amount of three or more PPAR agonists selected from the group consisting of glyceryl linoleate, glyceryl linolenate, xymenynic acid, and *Pterocarpus marsupium* bark extract, and pharmaceutically or cosmetically acceptable excipients, wherein the topical formulation is suitable for topical administration.

Embodiments are directed to methods of improving the look and feel of hair comprising topically administering a topical formulation comprising a composition of an effective amount of the following PPAR agonists: glyceryl linoleate, glyceryl linolenate, xymenynic acid, and *Pterocarpus marsupium* bark extract, and pharmaceutically or cosmetically acceptable excipients, wherein the topical formulation is suitable for topical administration.

Embodiments disclosed herein are directed to methods of treating acne comprising topically administering a topical formulation comprising a composition having an effective amount of three or more PPAR agonists selected from the group consisting of glyceryl linoleate, glyceryl linolenate, xymenynic acid, and *Pterocarpus marsupium* bark extract, and pharmaceutically or cosmetically acceptable excipients, wherein the topical formulation is suitable for topical administration.

Embodiments are directed to methods of treating acne comprising topically administering a topical formulation comprising a composition of an effective amount of the following PPAR agonists: glyceryl linoleate, glyceryl linolenate, xymenynic acid, and *Pterocarpus marsupium* bark extract, and pharmaceutically or cosmetically acceptable excipients, wherein the topical formulation is suitable for topical administration. In some embodiments, the topical formulation modulates the proliferation and differentiation of sebocytes.

Embodiments disclosed herein are directed to methods of decreasing inflammation and irritation caused by acne lesions comprising topically administering a topical formulation comprising a composition having an effective amount of three or more PPAR agonists selected from the group consisting of glyceryl linoleate, glyceryl linolenate, xymenynic acid, and *Pterocarpus marsupium* bark extract, and pharmaceutically or cosmetically acceptable excipients, wherein the topical formulation is suitable for topical administration.

Embodiments are directed to methods of decreasing inflammation and irritation caused by acne lesions comprising topically administering a topical formulation comprising a composition of an effective amount of the following PPAR agonists: glyceryl linoleate, glyceryl linolenate, xymenynic acid, and *Pterocarpus marsupium* bark extract, and pharmaceutically or cosmetically acceptable excipients, wherein the topical formulation is suitable for topical administration.

Embodiments disclosed herein are directed to methods of inhibiting *P. acnes* comprising topically administering a topical formulation comprising a composition having an effective amount of three or more PPAR agonists selected from the group consisting of glyceryl linoleate, glyceryl linolenate, xymenynic acid, and *Pterocarpus marsupium* bark extract, and pharmaceutically or cosmetically acceptable excipients, wherein the topical formulation is suitable for topical administration.

Embodiments are directed to methods of inhibiting *P. acnes* comprising topically administering a topical formulation comprising a composition of an effective amount of the following PPAR agonists: glyceryl linoleate, glyceryl linolenate, xymenynic acid, and *Pterocarpus marsupium* bark extract, and pharmaceutically or cosmetically acceptable excipients, wherein the topical formulation is suitable for topical administration.

Embodiments disclosed herein are directed to methods of preventing follicle clogging comprising topically administering a topical formulation comprising a composition having an effective amount of three or more PPAR agonists selected from the group consisting of glyceryl linoleate, glyceryl linolenate, xymenynic acid, and *Pterocarpus marsupium* bark extract, and pharmaceutically or cosmetically acceptable excipients, wherein the topical formulation is suitable for topical administration.

Embodiments are directed to methods of preventing follicle clogging comprising topically administering a topical formulation comprising a composition of an effective amount of the following PPAR agonists: glyceryl linoleate, glyceryl linolenate, xymenynic acid, and *Pterocarpus marsupium* bark extract, and pharmaceutically or cosmetically acceptable excipients, wherein the topical formulation is suitable for topical administration.

Embodiments disclosed herein are directed to methods of reducing the number of acne lesions comprising topically administering a topical formulation comprising a composition having an effective amount of three or more PPAR agonists selected from the group consisting of glyceryl linoleate, glyceryl linolenate, xymenynic acid, and *Pterocarpus marsupium* bark extract, and pharmaceutically or cosmetically acceptable excipients, wherein the topical formulation is suitable for topical administration.

Embodiments are directed to methods of reducing the number of acne lesions comprising topically administering a topical formulation comprising a composition of an effective amount of the following PPAR agonists: glyceryl linoleate, glyceryl linolenate, xymenynic acid, and *Pterocarpus marsupium* bark extract, and pharmaceutically or cosmetically acceptable excipients, wherein the topical formulation is suitable for topical administration.

In embodiments described herein, the subject is an infant, a child, an adolescent, or an adult.

In embodiments described herein, the topical formulation is formulated as a topical formulation for anti-aging, after sun care, skin lightening, skin brightening, acne treatment, inflammation treatment, hair treatment, or scalp treatment.

In some embodiments, the topical formulation can be applied to the skin one, two, three, four, five or more times each day, and application can be carried out for a period of at least 1 month, 2 months, 3 months, 4 months, 6 months, 8 months or 12 months.

In some embodiments, the topical formulation may be administered once, as needed, once daily, twice daily, three times a day, once a week, twice a week, every other week, every other day, or the like for one or more dosing cycles. A dosing cycle may comprise administration for about 1 week, about 2 weeks, about 3 weeks, about 4 weeks, about 5 weeks, about 6 weeks, about 7 weeks, about 8 weeks, about 9 weeks, or about 10 weeks. After this cycle, a subsequent cycle may begin approximately 1, 2, 3, 4, 5, 6, 7, 8, 9, 10, 11, or 12 weeks later. The treatment regime may comprise 1, 2, 3, 4, 5, or 6 cycles, each cycle being spaced apart by approximately 1, 2, 3, 4, 5, 6, 7, 8, 9, 10, 11, or 12 weeks.

In some embodiments, the methods may comprise a variety of additional steps including, for example, cleaning the surface tissue at the site of applying, abrading, microdermabrasion, toning, and the like.

Methods of Preparing Compositions Described Herein

Broadly speaking, the compositions and formulations may be prepared by combining together the components as described herein, at a temperature and for a time sufficient to provide an acceptable composition or topical formulation.

In some embodiments, the composition is prepared by combining glyceryl linoleate, glyceryl linolenate, xymenynic acid, and *Pterocarpus marsupium* bark extract in the percentages described in Table 1. Phase A1 to kettle using a nitrogen blanket, however this is not required. Start heating to 65-70° C. Add phase A2, pre-weighed solids, under agitation. When dissolved add phase A3, pre-weighed solids. Maintain temperature at 65-70° C. under propeller agitation until fully dissolved about 30 min to 3 hours. Check for small crystals and particles, if white colored crystals are present continue mixing at 65-70° C. for an additional hour. Once fully dissolved, not including colored insoluble particulates and plant fibers, cool to room temperature and discharge via pump through a 10 micron sock filter to remove remaining insoluble plant fibers. Preferably blanket drums/pails with nitrogen on pack out.

TABLE 1

| Composition components and % w/w | | |
|---|---|---|
| phase | INCI name | % w/w |
| A1 | Glyceryl Linoleate and Glyceryl Linolenate (~93:7) | 90.00 |
| A2 | Xymenynic Acid | 7.00 |
| A3 | *Pterocarpus Marsupium* Bark Extract | 3.00 |

In some embodiments, the composition is prepared in a topical formulation, a finished product. In some embodiments, the topical formulation is an oil-in-water (O/W) emulsion, including silicone emulsions, wherein the composition described herein is incorporated into the oil phase prior to emulsification at about 0.5% to 5%. In some embodiments, the topical formulation is an oil-in-water (O/W) emulsion, including silicone emulsions, wherein the composition described herein is dispersed into an emulsified phase at about 0.5% to 5% with agitation. In some embodiments, the topical formulation is an oil-in-water (O/W) emulsion, including silicone emulsions, wherein the composition described herein is not exposed to a temperature above 75° C.

In some embodiments, the composition is prepared in a topical formulation, a finished product. In some embodiments, the topical formulation is a water-in-oil (W/O) emulsion, including silicone emulsions, wherein the composition described herein is incorporated into the oil phase prior to emulsification at about 0.5% to 5%. In some embodiments, the topical formulation is a water-in-oil (W/O) emulsion, including silicone emulsions, wherein the composition described herein is dispersed into an emulsified phase at about 0.5% to 5% with agitation. In some embodiments, the topical formulation is a water-in-oil (W/O) emulsion, including silicone emulsions, wherein the composition described herein is not exposed to a temperature above 75° C.

In some embodiments, the composition is prepared in a topical formulation, a finished product. In some embodiments, the topical formulation is an anhydrous oil, an ointment, or a hot pour wax (i.e. continuous phase formulations), wherein the composition described herein is incorporated into the oil phase at about 0.5% to 5% with minimal propeller agitation at room temp conditions. In some embodiments, the oil phase is a polar oil.

The subject matter is now described with reference to the following examples. These examples are provided for the purpose of illustration only and the claims should in no way be construed as being limited to these examples, but rather should be construed to encompass any and all variations which become evident as a result of the teaching provided herein. Those of skill in the art will readily recognize a variety of non-critical parameters that could be changed or modified to yield essentially similar results.

EXAMPLES

Example 1: Antioxidant Activity of RFV3 and THD Ascorbate in Lipo-ORAC Test

Because of its damaging effect on vital biological systems, oxidative stress has been implicated in more than 100 diseases and aging. The objective of this test was to measure the antioxidant potential of the test materials listed in Table I using lipophilic oxygen radical absorbance capacity (Lipo-ORAC) assay (Stock solutions were prepared in acetone at 2% and diluted in 7% RMCD immediately before the experiment).

Lipo-ORAC assay measures the ability of antioxidant compounds to inhibit the decline in disodium fluorescein (FL) fluorescence that is induced by peroxyl radical generator, 2',2'-Azobis (2-amidinopropane) dihydrochloride (AAPH). The peroxyl radical is one of the most common reactive oxygen species (ROS) found in the body. This procedure incorporates random methylated beta-cyclodextrin as a solubility enhancer and allows for quantification of antioxidant potential of lipophilic samples, using Trolox as standard. Applied Biosystems Cytofluor 4000 fluorometer and software were used for the quantification of this assay. Detection threshold level was established as a read-out value equivalent or superior to Trolox at 2.5 μg/mL.

Results and Discussion: As illustrated in Table 1, RFV3 had the LIPO-ORAC value of 400 μmoles TE/g, which is considered high. THD ascorbate had no activity in this assay system. Trolox yielded the expected ORAC score of ~4000 μmoles TE/g, across the whole tested concentration range technically validating the experiment. Lipophilic oxygen radical absorbance capacity (Lipo-ORAC) score for the test materials, expressed in Trolox equivalents. Confirmed antioxidant activity retained after processing blend at elevated temps. Linoleic acid and derivatives can oxidize forming free radicals. Results provided in Table 2.

TABLE 2

Lipophilic oxygen radical absorbance capacity (Lipo-ORAC) score for the test materials, expressed in Trolox equivalents.

| Test Material | ORAC µmoles TE/g |
|---|---|
| RFV3 (90% Glyceryl Linoleate (and) Glyceryl Linolenate, 7% Ximenynic Acid, 3% *Pterocarpus Marsupium* Bark Extract) | 400 |
| Tetrahexyldecyl (THD) ascorbate (popular oil soluble Vitamin C Ester) | 0 |
| Trolox | 3985 |

Example 2: Assessment of Skin Irritation Potential of RFV3 in the Reconstructed Human Epidermal Model EpiDerm The objective of this assay was to interrogate whether RFV3 has an irritation potential in the reconstituted epidermis model. It was determined that RFV3 diluted to 10% (v:v) in Finsolv has no irritation activity in this model.

Materials and Methods: Thirty µl of each sample was applied on top of EpiDerm skin substitutes. RFV3 was tested at 10%, using Finsolv TN C12-15 Alkyl Benzoate as the diluent/solvent.

EpiDerm skin substitutes (cat. EPI-200-SIT; Lot #29690) and 5% SDS solution (positive control) were obtained from MatTek (Ashland, Mass.). The test was generally performed according to MatTek protocol. The study was conducted in line with requirements of OECD GD 34 and ECVAM Performance Standard document for applying human skin models to in vitro skin irritation. This protocol utilizes the MTT-based cytotoxicity readout as the experimental endpoint, and thus effectively measures the cytotoxicity of test materials at the level of the skin. MTT [3-(4,5-Dimethylthiazol-2-yl)-2,5-diphenyltetrazolium bromide, a tetrazole] which is yellow, is reduced to purple formazan in living cells and this conversion is measured in a colorimetric assay. MTT assay measures the activity of succinate dehydrogenase, a key enzyme in the respiratory electron transport chain in mitochondria and is a generally-accepted test for measuring cytotoxicity.

The test material was assayed in duplicates. Controls were assayed in triplicates. The negative control was type I sterile water and Finsolv. The positive control was 5% SDS. All incubations were at 37° C. The pre-incubation time 1 (tissue acclimatization time) was overnight and the exposure to samples was 60 min. Tissues were then rinsed with sterile PBS and placed in the new culture medium. Post-incubation time 1 was 24 h, afterward medium was collected and saved at −20° C. for later interleukin quantification, and tissues were placed in new medium. Post-incubation time 2 was 18 h (both post-incubation times are to allow the consequences of the potential irritation to fully develop), MTT test (irritation readout) was 3 h and the extraction was left overnight. The extracted formazan (the product of the MTT conversion, proportional to cell viability) was quantified with Molecular Devices microplate reader MAX190 by colorimetry. Signal quantification was performed using SoftMax3.1.2PRO at 560 nm. For IL-8 quantification (a complementary method for assessing skin irritation), 100 µl samples of media from each well were tested in triplicates using CytoSet antibody pair for ELISA from Thermo Fischer Scientific (Waltham, Mass.; cat. #133301) according to the manufacturer's instructions. The colorimetric signal proportional to IL-8 concentration in the tissue-conditioned medium was acquired with Molecular Devices microplate reader MAX190.

Statistically significant variation was defined as ≥15% variation from the water control with p value<0.05 calculated using double-tailed t-test.

Results and Discussion: The colorimetric quantification of the product of MTT metabolism (formazan) is provided in Table 2. As reported in Table 3 below, the viability of tissues treated with all experimental conditions, except the positive control (SDS), was above 50% of the water (negative) control, which classifies RFV3 at 10% as non-irritant and non-cytotoxic in this model system. Table 2 also summarizes the non-irritant (NI) or irritant (I) classification for all materials and controls used in this assay. The treatment with the positive control, 5% SDS detergent, was cytotoxic, as expected, leaving only 12% of cells viable. The replicates met standard deviation (SD) criterion defined by the protocol i.e., SD<18% and the viability of Positive Control (5% SDS) tissues was less than 20% of the negative control. Table 2 presents the results of IL-8 quantification in the media conditioned by EpiDerm tissues exposed to different experimental conditions. The level of IL-8 detected in the EpiDerm-conditioned media correlates with the irritation rate and is a secondary readout method. The test material did not stimulate the IL-8 output. SDS (the positive control) triggered a 55% decrease of the IL-8 level due to cytotoxicity, technically validating the experiment.

TABLE 3

Viability of EpiDerm tissues exposed to different experimental conditions with SD and statistical significance vs. water.

| Test Material | Mean of OD | SD of OD | Mean of Viability [% water] | Statistical significance (p value) | Classification | Qualification |
|---|---|---|---|---|---|---|
| Water | 0.331 | 0.009 | 100 | 1.000 | NI | qualified |
| 5% SDS | 0.038 | 0.004 | 2 | 0.000 | I | qualified |
| Finsolv | 0.392 | 0.036 | 118 | 0.000 | NI | qualified |
| RFV3 | 0.419 | 0.008 | 131 | 0.000 | NI | qualified |

SD: standard deviation.
OD: optical density (absorbance).
I = irritant; NI = non irritant.
"qualified": test criteria fulfilled.

Example 3: Transcriptional Regulation by PPAR-α

Peroxisome proliferator-activated receptor alpha (PPAR-α) is a nuclear receptor protein encoded by the PPARA gene. This transcription factor belongs to the steroid hormone receptor superfamily and controls the expression of target genes involved in cell proliferation, cell differentiation and in immune and inflammatory responses. PPAR ligands (peroxisome proliferators) increase the size and number of peroxisomes, subcellular organelles found in plants and animals involved in energy homeostasis as well as cholesterol and lipid metabolism.

The objective of this project was to determine the effects of the test materials listed in Table 4 on the transcription regulatory activity of PPARα in a luciferase reporter assay system.

TABLE 4

Test compositions for Comparative studies

| Test Sample Code | INCI name(s) |
|---|---|
| 10HSA | Hydroxystearic Acid, by DSM under trade name BEAUACTIVE |
| 12HSA | Hydroxystearic Acid, Unilever patented ingredient (PCT/EP2009/056886) |
| EQB Blend | 90% Glyceryl Oleate, 7% Palmitic Acid, 3% Hydroxy-resveratrol |
| ELELEO | Ethyl Linoleate (and) Ethyl Linolenate (and) Ethyl Oleate |
| ODA | Octadecenedioic Acid |
| VFF | Linoleic Acid (and) Linolenic Acid |
| RFV3 | 90% Glyceryl Linoleate (and) Glyceryl Linolenate, 7% Ximenynic Acid, 3% *Pterocarpus Marsupium* Bark Extract |
| XA | Ximenynic Acid |
| GLGL | Glyceryl Linoleate (and) Glyceryl Linolenate |
| P90 | *Pterocarpus Marsupium* Bark Extract (90% resveratrol dimethyl ether) |
| H20 | Water/$H_2O$, Blank control |
| GW590735 | GW590735, Positive control |
| Rosiglitazone | Rosiglitazone, Positive control |

A variety of samples were tested on the effect on the transcription of the PPAR-α controlled luciferase reporter gene. CHO cells were utilized and are an epithelial cell line derived from the ovary of the Chinese hamster. Positive control: GW590735 at 300 nM is a potent and selective agonist of PPARα. Table 3 provides the composition of each test sample.

Figure 2:
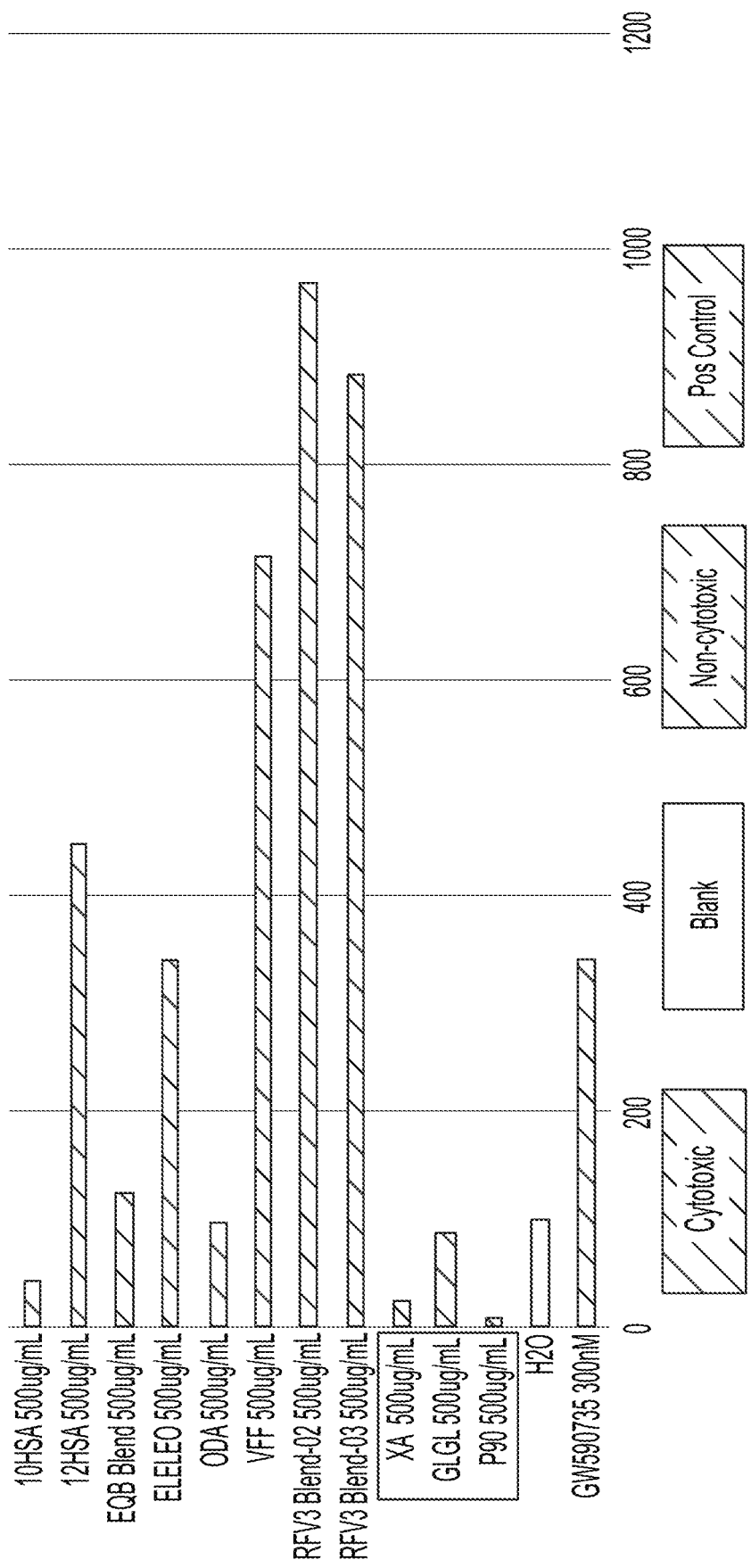
FIG. 2 presents percent of control of each test material at 500 µg/mL Dilution in the PPAR-α luciferase experiment.

PPAR-α Luciferase experiment: Compositions were tested at 250 μg/mL Dilution in DMSO (FIG. 1) and 500 μg/mL Dilution in DMSO (FIG. 2). Positive control: GW590735 at 300 nM is a potent and selective agonist of PPARα.

Figure 3:
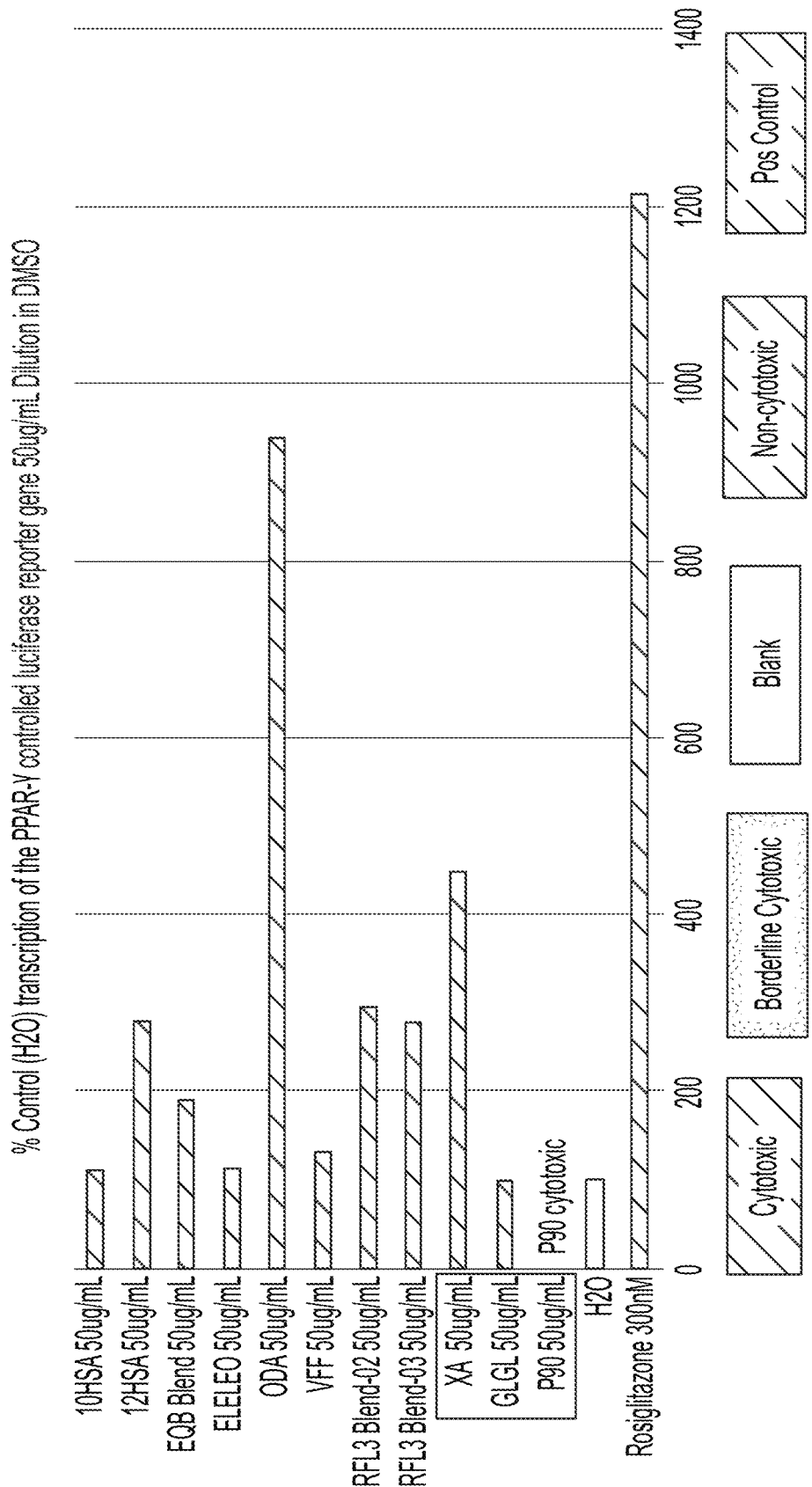
FIG. 3 presents percent of control of each test material at 50 µg/mL Dilution in the PPAR-γ luciferase experiment.
Figure 4:
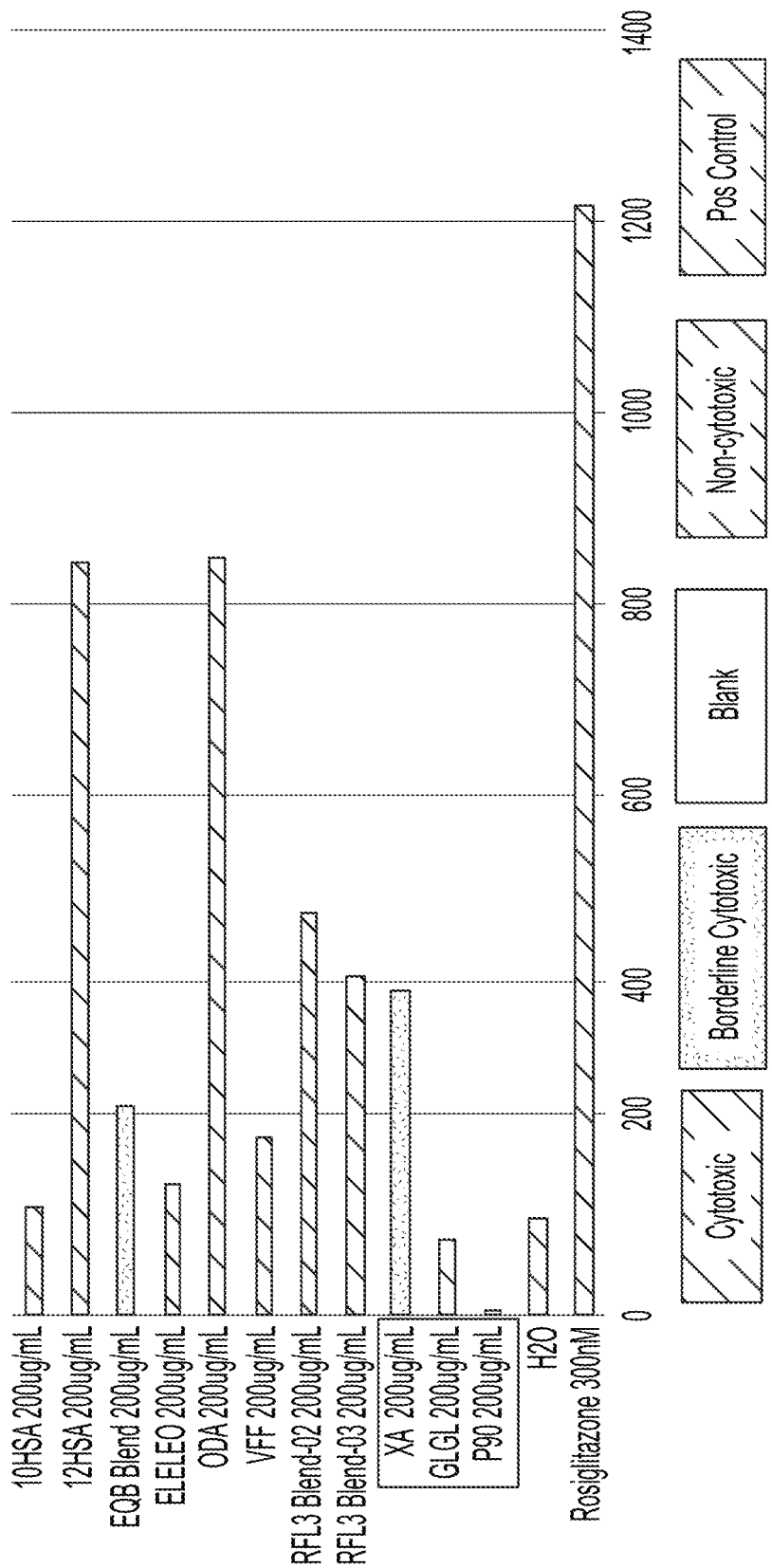
FIG. 4 presents percent of control of each test material at 200 µg/mL Dilution in the PPAR-γ luciferase experiment.

PPAR-γ Luciferase experiment: Compositions were tested at 50 μg/mL Dilution in DMSO (FIG. 3) and 200 μg/mL Dilution in DMSO (FIG. 4). Positive control: Rosiglitazone at 300 nM potent and selective agonist of PPARγ.

Table 5 summarizes the effect of different concentrations of test materials on the transcriptional activation of the luciferase reporter gene under the PPAR-α-controlled promoter (2 separate experiments, Experiment 1 wherein sample prep was done in water and Experiment 2 wherein the sample prep was done in DMSO). RFV3 had a statistically-significant dose-dependent stimulatory effect. Importantly, this effect was not due to the intrinsic properties of the test material, because no signal was registered with RFV3 alone (without cells). Linefill (manufactured by PROVITAL: 55-75% Caprylic/Capric Triglyceride, 25-40% Dimethyl Isosorbide, 3-5% *Sesamum indicum* (Sesame) Seed Extract, 0.2-0.3% Tocopherol) registered a stimulatory effect at the highest concentration tested, which, however, was not statistically significant. All non-cytotoxic experimental conditions except GLGL had a statistically-significant stimulatory effect. The positive control GW590735 strongly upregulated the expression of the reporter gene technically validating the experiment.

TABLE 5

Effect of different experimental conditions on the transcription of the PPAR-α luciferase reporter gene.

| Test Material | Chemoluminescence (arbitrary units) | P value | SEM | % Control ($H_2O$) | Cytotoxic? |
|---|---|---|---|---|---|
| Experiment 1 | | | | | |
| GW590735 300 nM | 344 | 0.000 | 25 | 365 | Not observed |
| $H_2O$ | 94 | 1.000 | 8 | 100 | Not observed |
| RFV3 200 μg/mL | 130 | 0.096 | 21 | 138 | Not observed |

TABLE 5-continued

Effect of different experimental conditions on the transcription of the PPAR-α luciferase reporter gene.

| Test Material | Chemoluminescence (arbitrary units) | P value | SEM | % Control (H$_2$O) | Cytotoxic? |
|---|---|---|---|---|---|
| RFV3 1000 µg/mL | 193 | 0.000 | 19 | 205 | Not observed |
| RFV3 5000 µg/mL | 239 | 0.000 | 6 | 254 | Not observed |
| Linefill 200 µg/mL | 76 | 0.253 | 14 | 81 | Not observed |
| Linefill 1000 µg/mL | 105 | 0.538 | 10 | 111 | Not observed |
| Linefill 5000 µg/mL | 115 | 0.363 | 25 | 122 | Not observed |
| Experiment 2 | | | | | |
| GW590735 300 nM | 19 | 0.000 | 1.4 | 341 | |
| H$_2$O | 6 | 1 | 0.5 | 100 | |
| P90 500 µg/mL | 0 | 0.000 | 0.1 | 7 | Yes |
| P90 250 µg/mL | 1 | 0.000 | 0.5 | 12 | Yes |
| GLGL 500 µg/mL | 5 | 0.470 | 0.8 | 86 | |
| GLGL 250 µg/mL | 5 | 0.504 | 0.2 | 88 | |
| XA 500 µg/mL | 1 | 0.001 | 0.1 | 24 | Yes |
| XA 250 µg/mL | 8 | 0.027 | 0.2 | 145 | |
| RFV3-03 500 µg/mL | 48 | 0.000 | 9.2 | 881 | |
| RFV3-03 250 µg/mL | 27 | 0.000 | 6.9 | 491 | |
| RFV3-02 500 µg/mL | 53 | 0.000 | 6.7 | 968 | |
| RFV3-02 250 µg/mL | 47 | 0.000 | 5.5 | 849 | |
| VFF 500 µg/mL | 39 | 0.000 | 8.1 | 714 | |
| VFF 250 µg/mL | 29 | 0.000 | 3.6 | 535 | |
| ODA 500 µg/mL | 5 | 0.868 | 1.1 | 97 | Yes |
| ODA 250 µg/mL | 15 | 0.000 | 0.9 | 278 | |
| ELELEO 500 µg/mL | 19 | 0.000 | 0.9 | 338 | |
| ELELEO 250 µg/mL | 22 | 0.000 | 3.6 | 405 | |
| EQB 500 µg/mL | 7 | 0.212 | 0.2 | 124 | Yes |
| EQB 250 µg/mL | 6 | 0.829 | 2.4 | 106 | Yes |
| 12HSA 500 µg/mL | 24 | 0.000 | 8.9 | 445 | Not observed |
| 12HSA 250 µg/mL | 42 | 0.000 | 4.4 | 766 | Not observed |
| 10HSA 500 µg/mL | 2 | 0.010 | 1.0 | 41 | Yes |
| 10HSA 250 µg/mL | 2 | 0.012 | 0.9 | 45 | Yes |

Example 4: Effect of RFV3 on the Metabolism, Proliferation, IL-8 and Type I Collagen Output in the Model of Adult Human Dermal Fibroblasts Subjected to Photo-Oxidative Stress Activation of PPARγ increases mitochondrial biogenesis, oxygen consumption, ΔΨm, antioxidant defenses, regulates autophagy, and increases transcription factors, like PGC1α, NRF1-2, TFAM. Also PPARγ agonists regulate apoptosis and reduce inflammation. Thus, PPARγ agonists regulate the expression of several target genes improving mitochondrial function and increasing redox capacity. Experimental Condition tested was UVA-irradiated adult human dermal fibroblasts (HDF).

The objective of this project was to determine the effects of the test material on a series of skin-relevant parameters in UVA-irradiated adult human dermal fibroblasts (HDF), in the context of the total mitochondrial metabolism and proliferation of these cells.

Materials and Methods: Test material was dissolved in DMSO at 100 mg/ml and further dilutions were made in distilled water (dH$_2$O). Samples were added in triplicates to exponentially growing aged adult human dermal fibroblasts (HDF; 10,000 cells/well of a 96 well plate; p. 12 Cell Applications, San Diego, Calif., cat. #106-05a; lot #3014). Cultures were maintained in DMEM/10% FBS and 24 h after sample additions, they were irradiated with UVA at 5.2 mW/cm$^2$ for 30 min. with UVA lamp UVA-28T (Ultra-lum), in order to induce photo-oxidative stress in plasma and mitochondrial membranes. Seventy-two h. later the experiment was terminated and type I collagen was quantified in the cell culture medium (soluble fraction) and on fixed cells (insoluble fraction) by ELISA. IL-8 was also measured in the cell culture-conditioned medium. Total insoluble (cytoskeletal) proteins were quantified to determine the effect of test materials on cell proliferation (cell numbers or cell #). These values were also used to standardize type I collagen and IL-8 output data to cell numbers, using the formula:

[macromolecule of interest raw read-out value]/[cell number raw read-out value]

This standardization was performed separately for every well. Each experimental condition and control was assayed at least in triplicates. The effect of the test material on mitochondrial metabolism was measured by the MTT assay, which measures the activity of mitochondrial dehydrogenases, such as succinate dehydrogenase, implicated in the respiratory electron transport chain in mitochondria. All colorimetric measurements were performed using Molecular Devices microplate reader MAX190 and SoftMax3.1.2PRO software. Statistical significance was assessed with paired Student test. Deviations of ≥20% as compared to water control with p values below 0.05 were considered statistically significant.

Results and Discussion: UVA radiation is the prevalent component of the solar UV spectrum and main effector of photoaging. It penetrates deeper into the skin than UVB and induces photooxidative stress not only in the epidermal layer but also in the dermis. The UVA irradiation protocol followed (with modifications) in this project was designed to study the effects of carotenoids on human dermal fibroblasts (HDF) subjected to photooxidative stress.

The results (Table 6) show that UVA irradiation triggered an increase of soluble type I collagen, perhaps partially due to an increase of metalloproteinase activity. This is supported by the fact that the deposited, insoluble collagen was modestly decreased (by 10%) by UVA irradiation. A modest (15%) increase of IL-8 secretion was also detected in UVA-irradiated cells.

TABLE 6

Effect of UVA irradiation on IL-8 in the HDF culture media and on soluble and insoluble type I collagen, standardized to cell numbers and expressed as % of values recorded in non-irradiated HDF culture.

| HDF Irradiation Status | Type 1 Collagen (deposited) | Type 1 Collagen (soluble) | IL-8 |
|---|---|---|---|
| UVA-irradiated | 90% | 167% | 117% |
| Non-irradiated | 100% | 100% | 100% |

Table 6 shows that RFV3 was cytotoxic at the highest tested concentrations (500 μg/ml). This data established the upper limit of the concentration framework to employ in further cell-based assays with this material. Table 7 also shows that at the non-cytotoxic concentrations 20 μg/ml and 100 μg/ml RFV3 did not have a statistically-significant effect on cell proliferation, type I collagen output (soluble and insoluble) nor interleukin-8 secretion to the cell culture conditioned medium. It did however significantly stimulate the mitochondrial metabolism (bolded). Importantly, this increase was dose-dependent. These results suggest that RFV3 could provide mitochondrial health-related benefits to the skin without the irritation side effect at a broad range of concentrations. These mitochondrial health-related benefits could include increased ATP production, upregulated oxidative respiration (as opposed to glycolysis, which is more used by cancer cells) and stimulate energy and macromolecule output for skin regeneration.

TABLE 7

Effect of RFV3 on IL-8 in the HDF culture media and on soluble and insoluble type I collagen, standardized to cell numbers and expressed as % of values recorded in water-treated control culture.

| Experimental Condition in UVA-irradiated HDF | Type I Collagen (deposited) | Type I Collagen (soluble) | IL-8 | Mitochondrial Metabolism | Cell Numbers |
|---|---|---|---|---|---|
| Water | 100% | 100% | 100% | 100% | 100% |
| RFV3 20 μg/ml | 116% | 104% | 117% | 141%* | 93% |
| RFV3 100 μg/ml | 125% | 85% | 104% | 195%* | 92% |
| RFV3 500 μg/ml | N/A | N/A | N/A | N/A | N/A |

*p value < 0.05.
N/A: does not apply (cytotoxic).

Example 5: Effect of RFV3 on Melanin Content in Melanocytes and Melanocyte-Conditioned Medium This project was to assess the effects of the test material on the intracellular melanin content in human melanocytes.

Materials & Methods: Test material was dissolved at 100 mg/ml in DMSO the day of the experiment, diluted in sterile distilled water and samples were added in duplicates to confluent cultures of C57BL/6 mouse melanocytes well plate format. The cell growth medium was Opti-MEM supplemented with 7% horse serum (ThermoFisher Scientific, Waltham, Mass.) and antibiotics. Medium was freshly changed on Day 0 of the experiment. Cells were grown in the presence of the test material for 3 days, afterward they were frozen at −20° C., lysed in Solvable (Perkin Elmer, Waltham, Mass.) at 37° C. for 60 min. and colorimetrically quantified at 490 nm with Molecular Devices (Sunnyvale, Calif.) microplate reader MAX190. Kojic acid (100 µg/ml and 200 µg/ml) was the positive control. Statistically significant variation was defined as >20% variation from the water control with p value<0.05 calculated with double-tailed t-test.

Figure 5:
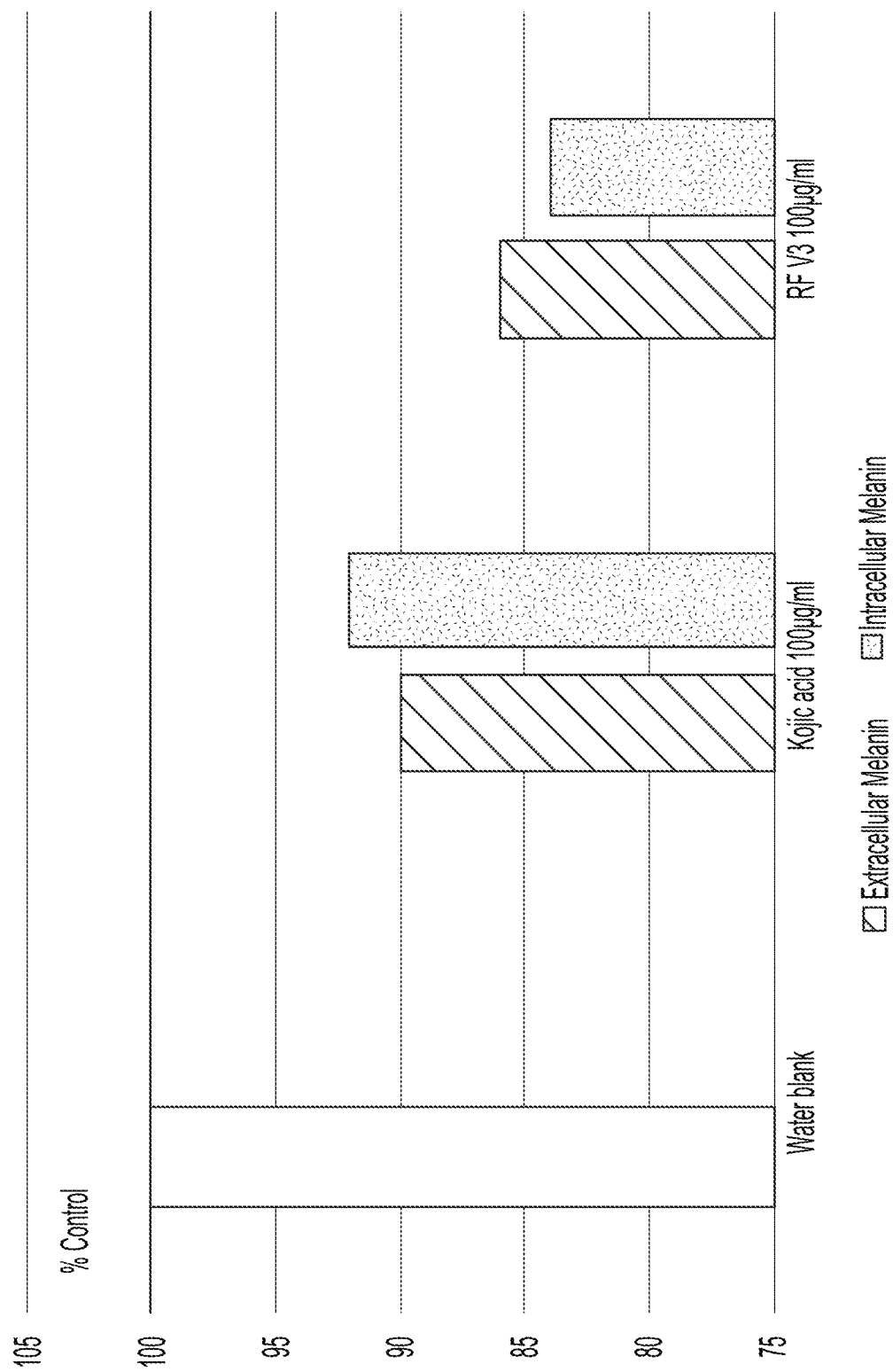
FIG. 5 demonstrates test material at 100 µg/mL inhibits melanogenesis.

Results and Discussion: As reported in Table 8, neither RFV3 nor the positive control kojic acid had a statistically significant effect on extra- or intracellular melanin content at all tested concentrations. However, a trend was observed towards a modest inhibition for both compounds. PPARα agonists are known to inhibit proliferation of melanocytes. Though not significant, the results of FIG. 5 demonstrate a trend in melanogenesis and benefit of RFV3 as a brightening, skin whitening composition. PCR also demonstrated decrease in HGF in RFV3 tested cells.

TABLE 8

Effect of different experimental conditions on the melanin content in murine melanocyte-conditioned medium (extracellular melanin) and in the melanocytes (intracellular melanin).

| Test Material | % Control (extracellular melanin) | P value | % Control (intracellular melanin) | P value |
|---|---|---|---|---|
| H$_2$O | 100 | 1 | 100 | 1 |
| Kojic acid 200 µg/ml | 84 | 0.189 | 86 | 0.180 |
| Kojic acid 100 µg/ml | 90 | 0.429 | 92 | 0.491 |
| RFV3 200 µg/ml | 103 | 0.217 | 86 | 0.265 |
| RFV3 100 µg/ml | 86 | 0.376 | 84 | 0.150 |
| RFV3 20 µg/ml | 101 | 0.593 | 95 | 0.642 |
| RFV3 4 µg/ml | 104 | 0.814 | 96 | 0.702 |

Test materials were added to exponentially-growing cultures and the experiment was terminated 3 days later.

Example 6: Effect of RFV3 on the Expression of a Panel of Genes Relevant to the Structure and Function of the Epidermis in a 3D Tissue Substitute Model The objective of this project was to determine the effects of the test material (RFV3) on the expression of a panel of genes relevant to the structure and function of the epidermis using a 3D tissue substitute model.

Materials and Methods:

Glycerin (99.7% USP) was the negative control. Epidermal substitutes (cat. #102-3D-12; lot #2744) were obtained from Cell Applications (San Diego, Calif.). They were prepared in vitro in PCF inserts from neonatal keratinocytes and fibroblasts, and differentiated over a period of about two weeks into stratified squamous epithelium. Such 3D cultures approximate human epidermis and are commonly used for skin aging research. Tissues were equilibrated in cell culture incubator for 60 min. and were exposed to the test material at 2% (diluted in glycerin), and to the negative control (glycerin) in triplicates for 24 h. At the end of the incubation (24 h) tissues were rinsed and RNA was extracted and purified with NucleoSpin RNA kit from Macherey-Nagel (cat. #740955.240C; Bethlehem, Pa.), using QiaCube robotic station (Qiagen, Germantown, Md.). Purified total RNA was assessed at 260 nm and 280 nm with NanoDrop Lite (Thermo Fisher Scientific, Waltham, Mass.), pure samples with A260/A280 and A260/A230 ratios of >1.7 were standardized and the expression of the panel of genes of interest was quantified by qPCR with BioRad iCycler iQ Detection System using primers from Realtimeprimers (RTP; Elkins Park, Pa.), 5× All-In-One 1st Strand cDNA Synthesis Mix (cat. #AZ-1996, Azura Genomics/RTP) and Fast Green qPCR Master Mix-Fluor (cat. #4375; Azura Genomics/RTP). Efficiency ΔΔCt method was used for quantification of results, after the normalization of gene expression to eight housekeeping genes. Genes were considered differentially expressed if the level of expression was reasonably high (≤30 cycles to detect), p value was <0.05 and the modulation (fold change) was ≥2.

Results and Discussion: The PCR array experiment was successful in terms that it resulted in the collection of high purity (A260/A280 ratio>1.7) total RNA from all tissues. RNA samples were then converted to DNA and PCR reactions were run using the array panel. Gene expression in test material-treated tissues was then compared according to glycerin-treated controls. Fold change vs. control for each interrogated probe was reviewed.

Conclusion: Taken together, RFV3 has a complex effect ranging from immunomodulatory (for example upregulation of S100A8 and TLR2; downregulation of IL-6 and S100A9) to supporting epidermal structure, differentiation and barrier function [upregulation of AQP3 water channel, CDH1, filaggrin, some keratins, late cornified proteins, and membrane bilayer ceramides (through CERS3 increase)].

Example 7: Assessment of Skin Barrier Repair Activities of a Product on Human Living Skin Explants Ex Vivo The aim of the study is to evaluate skin barrier repairing activities of a product, tested at 3 concentrations on human living skin explants ex vivo. This activity has been assessed by: control of the cell viability, immunostaining of ceramides, immunostaining of filaggrin, and immunostaining of transglutaminase-1 (TGM1).

Explant preparation: 66 explants of an average diameter of 11 mm (1 mm), including 33 delipidated explants, were prepared from an abdoplasty coming from a 54-year-old Caucasian woman (reference P2129-AB54) with a type II phototype. The explants were placed in survival in BEM culture medium (BIO-EC's Explants Medium) at 37° C. in a humid, 5% CO$_2$ atmosphere.

Delipidation: On day 0 and on a delimited area, the abdoplasty was delipidated by applying twice a 1:1 (v:v) mixture of ether:acetone for 2 minutes, followed by a wiping of the skin surface with a paper tissue. On this delipidated area, 33 skin explants named "D" of an average diameter of 11 mm (1 mm) were prepared and placed in survival as described before.

Explants distribution: The explants were distributed into 12 batches as in Table 9.

TABLE 9

| Explant distribution | | | | |
|---|---|---|---|---|
| Batch | Destination | Treatment | No. of explants | Sampling Time |
| T0 | Skin biopsy control | — | 3 | Day 0 |
| D0 | Control delipidation | Delipidation | 3 | Day 0 |
| T | Untreated control | — | 6 | Day 0 + 3 h Day 1 (24 h) |
| E | Solvent | E | 6 | Day 0 + 3 h Day 1 (24 h) |
| P1 | Product 1 | P1 | 6 | Day 0 + 3 h Day 1 (24 h) |

TABLE 9-continued

Explant distribution

| Batch | Destination | Treatment | No. of explants | Sampling Time |
|---|---|---|---|---|
| P2 | Product 2 | P2 | 6 | Day 0 + 3 h Day 1 (24 h) |
| P3 | Product 3 | P3 | 6 | Day 0 + 3 h Day 1 (24 h) |
| D | Control delipidation | Delipidation | 6 | Day 0 + 3 h Day 1 (24 h) |
| DE | Delipidation + Solvent | Delipidation + E | 6 | Day 0 + 3 h Day 1 (24 h) |
| DP1 | Delipidation + Product 1 | Delipidation + P1 | 6 | Day 0 + 3 h Day 1 (24 h) |
| DP2 | Delipidation + Product 2 | Delipidation + P2 | 6 | Day 0 + 3 h Day 1 (24 h) |
| DP3 | Delipidation + Product 3 | Delipidation + P3 | 6 | Day 0 + 3 h Day 1 (24 h) |

Product application: On day 0 just after delipidation, the products P1, P2 and P3 and the placebo E were topically applied on the basis of 2 µl per explant (2 mg/cm2) and spread using a small spatula. The control explants T did not receive any treatment.

Sampling: On day 0, 3 explants from the batch TO and DO (just after delipidation) were collected and cut in two parts. Half was fixed in buffered formalin solution and half was frozen at −80° C. On day 0+3 h (3 h after delipidation) and day 1 (24 h after delipidation), 3 explants from each batch were collected and processed in the same way than TO.

Histological processing: After fixation for 24 hours in buffered formalin, the samples were dehydrated and impregnated in paraffin using a Leica PEARL dehydration automat. The samples were embedded using a Leica EG 1160 embedding station. 5-µm-thick sections were made using a Leica RM 2125 Minot-type microtome, and the sections were mounted on Superfrost® histological glass slides. The frozen samples were cut at 7-µm thickness with a Leica CM 3050 cryostat. The sections were then mounted on silanized glass slides Superfrost® Plus. The microscopical observations were realized using a Leica DMLB or Olympus BX43 microscope. Pictures were digitized with a numeric DP72 Olympus camera with CeliD storing software.

Cell viability: The cell viability of the epidermal and dermal structures was assessed by microscopical observation of paraffinized sections after Masson's trichrome staining, Goldner variant. The staining was assessed by microscopical observation. Concerned batches: all.

Ceramides immunostaining: Ceramides immunostaining has been performed on formalin-fixed paraffin-embedded sections with a monoclonal anti-ceramides antibody (Glycobiotech, ref. MAB_0013, clone S58-9) diluted at 1:25 in PBS, BSA 0.3% and Tween 20 (0.05%) for 1 h at room temperature, amplified with a biotin/streptavidin system and revealed by VIP, a violet substrate of peroxidase (Vectore, ref. PK-7200). The immunostaining was performed using an automated slide-processing system (Dako, AutostainerPlus) and was assessed by microscopical observation. Concerned batches: all.

Filaggrin immunostaining: Filaggrin immunostaining has been performed on formalin-fixed paraffin-embedded sections with a monoclonal anti-filaggrin antibody (Santa Cruz, ref. sc-66192, clone AKH1) diluted at 1:1000 in PBS, BSA 0.3% and Tween 20 (0.05%) for 1 h at room temperature and revealed by Alexa Fluor 488 (Lifetechnologies, ref. A11001). Nuclei have been counterstained with propidium iodide. The immunostaining was performed using an automated slide-processing system (Dako, AutostainerPlus) and was assessed by microscopical observation. Concerned batches: all.

TGM1 immunostaining: TGM1 immunostaining has been performed on formalin-fixed paraffin-embedded sections with a polyclonal anti-TGM1 antibody (Novus biologicals, ref. NB100-1844) diluted at 1:100 in PBS, BSA 0.3% and Tween 20 (0.05%) for 1 h at room temperature, amplified with a biotin/streptavidin system and revealed by VIP, a violet substrate of peroxidase (Vector, ref. PK-7200). The immunostaining was performed using an automated slide-processing system (Dako, AutostainerPlus) and was assessed by microscopical observation. Concerned batches: all.

Ceramides: Stratum corneum (SC) is the uppermost layer of the skin, composed from 5 to 30 cellular layers. The main unit of the SC is the corneocyte, anucleated cell filled by a hydrophilic mass of keratin filaments and surrounded by a lipid-rich extracellular matrix. The most important intercellular lipids of corneocytes are ceramides, cholesterol and fatty acids, representing 50%, 25% and 10%, respectively, of the total lipidic mass of the SC. Intercellular lipids, including ceramides, limit the trans-epidermal water loss (TEWL). In addition, they represent a real physical barrier protecting the epidermis from external stimuli. Ceramides are the precursors of all sphingolipids. They are formed by the link between a fatty acid and a sphingoid base, the sphingosin for ceramides, and the dehydro-sphingosin for dehydro-ceramides. Phytoceramides, with a base of phyto-sphingosin associated to a C-4 hydroxyl group are also found in the SC.

Filaggrin: Filaggrin is initially synthetized as its precursor, the pro-filaggrin, a protein of about 400 kDa highly phosphorylated and insoluble. It represents the major constituent of keratohyalin granules of the stratum granulosum. During the late phase of the differentiation program of the epidermis, pro-filaggrin is dephosphorylated and cleaved by caspase-14 in several monomers of filaggrin. Successively, filaggrin is linked to keratin filaments, participating in their aggregation in microfibrils and in the formation of the cornified cell envelop. In the medial stratum corneum, filaggrin is then proteolysed in different fragments: this proteolysis is a central step for the formation of the natural moisturing factor (NMF). The NMF, due to its hygroscopic proprieties is directly implicated in the hydration of the horny layer.

Transglutaminase 1: Epidermal keratinocytes undergo terminal differentiation involving keratin aggregation, nuclear degradation, and replacement of the plasma membrane with a tough, insoluble proteinaceous envelope, the cornified envelop, that is cross-linked to extracellular lipid providing barrier function. Transglutaminases (TGMs) are Ca2+-dependent cross-linking enzymes that catalyze an acyl-transfer reaction between the-carboxamide group of protein-bound glutamine and various primary amines, most commonly the -amino group of lysine residues, thus forming isopeptide bonds between proteins that generate insoluble macromolecular assemblies. Four of the seven human TGases (1, 2, 3, 5) are expressed in terminally differentiating epithelia, including the skin. TGase 1 is essential for the cross-linking of substrates such as loricrin, trichohyalin and SPRs 1, 2 and 3. Crosslinking of proteins by transglutaminases increases their resistance to proteolytic degradation.

Epidermal lipid synthesis and metabolism are regulated by nuclear hormone receptors (NHR) and in turn epidermal lipid metabolites can serve as ligands to NHR NHR form a large superfamily of receptors modulating gene transcription through DNA binding. A subgroup of these receptors is ligand-activated and heterodimerizes with the retinoid X receptor including peroxisome proliferator-activated receptor (PPAR), liver X receptor (LXR) and pregnane X receptor (PXR).

TABLE 10

Compositions of samples tested

| Ingredient % w/w | Solvent 1 (E) | Product 1 (P1) (0.5% PPAR agonist complex) | Product 2 (P2) (3% PPAR agonist complex) | Product 3 (P3) (5% PPAR agonist complex) |
|---|---|---|---|---|
| Caprylic/Capric Triglyceride (CCT/Myritol® 312) | 100.00 | 99.50 | 97.00 | 95.00 |
| Glyceryl Linoleate | — | 0.40 | 2.40 | 4.00 |
| Glyceryl Linolenate | — | 0.05 | 0.30 | 0.50 |
| *Pterocarpus Marsupium* Bark Extract | — | 0.015 | 0.09 | 0.15 |
| Xymenynic Acid | — | 0.035 | 0.21 | 0.35 |

Solvent selected for ex vivo studies was Myritol®) 318 (INCI Name: Caprylic/Capric Triglyceride). Abdominal skin lipids comprised of about 25% triglycerides.

Parameters evaluated included image analysis of filaggrin, ceramides and TGM1. Table 11 is a summary of the results. DJ1 refers to delipidated batch day 1 and DEJ1 solvent-treated delipidated batch day 1.

TABLE 11

Percent increase or decrease of expression over control based on immunostaining.

| Variations vs DJ1 or DEJ1 | | E | P1 | P2 | P3 |
|---|---|---|---|---|---|
| Filaggrin | vs DJI | +8%$^{ns}$ | +28%$^{ns}$ | +41%** | +85%** |
| | vs DEJI | — | +19%$^{ns}$ | +30%** | +71%** |
| Ceramides | vs DJI | −7%$^{ns}$ | +161%** | +307%** | +357%** |
| | vs DEJI | — | +182%** | +339%** | +393%** |
| TGM1 | vs DJI | −39%** | +37%* | +57%** | +68%** |
| | vs DEJI | — | +124% | +156% | +173%** | ns = non-significant,
*p < 0.05 (95%),
**p < 0.01 (99%)

Raw data of ceramides image analysis, % surface in the stratum corneum, see Table 12.

TABLE 12

Ceramide raw data

| | TJ1 | DJ1 | DEJ1 | DP1J1 | DP2J1 | DP3J1 |
|---|---|---|---|---|---|---|
| 1 | 39.8 | 7.2 | 17.7 | 14.9 | 30.9 | 23.6 |
| 2 | 41.4 | 5.7 | 10.8 | 21.9 | 31.7 | 36.2 |
| 3 | 37.1 | 14.7 | 12.7 | 25.2 | 27.7 | 29.3 |
| 4 | 46.1 | 11.1 | 3.7 | 22.2 | 29.8 | 39.9 |
| 5 | 35.8 | 4.2 | 4.2 | 34.1 | 33.8 | 40.5 |
| 6 | 42.2 | 9.2 | 6.8 | 32.6 | 30.2 | 30.5 |
| 7 | 29.7 | 7.1 | 3.9 | 14.6 | 40.1 | 41.7 |
| 8 | 37.5 | 8.6 | 4.3 | 15.9 | 35.7 | 47.9 |
| 9 | 28.8 | 6.1 | 4.3 | 11.4 | 40.3 | 47.5 |
| Average | 37.6 | 8.2 | 7.6 | 21.4 | 33.4 | 37.5 |
| SD | 5.3 | 3.0 | 4.7 | 7.6 | 4.2 | 7.8 |

Raw data of filaggrin image analysis, % surface in the stratum corneum, see Table 13.

TABLE 13

Filaggrin raw data

| | TJ1 | DJ1 | DEJ1 | DP1J1 | DP2J1 | DP3J1 |
|---|---|---|---|---|---|---|
| 1 | 11.5 | 12.8 | 7.2 | 15.6 | 14.1 | 8.9 |
| 2 | 10.0 | 12.5 | 10.3 | 14.6 | 17.8 | 13.7 |
| 3 | 9.5 | 11.4 | 11.6 | 10.5 | 18.3 | 15.2 |
| 4 | 10.3 | 5.6 | 11.0 | 10.7 | 13.2 | 25.4 |
| 5 | 13.6 | 11.7 | 9.7 | 9.1 | 14.2 | 19.1 |
| 6 | 10.6 | 12.1 | 15.4 | 6.9 | 11.4 | 17.7 |
| 7 | 13.7 | 8.9 | 15.7 | 13.5 | 16.1 | 29.0 |
| 8 | 13.0 | 12.5 | 9.6 | 17.9 | 17.7 | 28.7 |
| 9 | 18.3 | 6.7 | 11.4 | 21.9 | 9.7 | 16.2 |
| Average | 12.3 | 10.5 | 11.3 | 13.4 | 14.7 | 19.3 |
| SD | 2.6 | 2.5 | 2.6 | 4.4 | 2.8 | 6.6 |

Raw data of TGM1 image analysis, % surface in the stratum corneum, see Table 14.

TABLE 14

TGM1 raw data

| | TJ1 | DJ1 | DEJ1 | DP1J1 | DP2J1 | DP3J1 |
|---|---|---|---|---|---|---|
| 1 | 52.3 | 19.5 | 12.9 | 29.5 | 36.2 | 35.1 |
| 2 | 41.6 | 23.8 | 16.8 | 34.0 | 37.0 | 41.1 |
| 3 | 38.1 | 17.1 | 16.0 | 36.3 | 31.8 | 32.2 |
| 4 | 51.5 | 20.2 | 9.0 | 21.2 | 31.4 | 35.1 |
| 5 | 55.5 | 19.1 | 3.7 | 27.1 | 34.1 | 35.3 |
| 6 | 58.7 | 16.6 | 11.8 | 19.7 | 33.1 | 32.4 |
| 7 | 50.3 | 26.0 | 16.3 | 25.8 | 30.9 | 35.9 |
| 8 | 46.6 | 23.6 | 20.9 | 45.4 | 35.9 | 37.8 |
| 9 | 51.8 | 25.4 | 10.1 | 23.8 | 30.4 | 36.0 |
| Average | 49.6 | 21.2 | 13.0 | 29.2 | 33.4 | 35.6 |
| SD | 6.1 | 3.3 | 4.8 | 7.7 | 2.3 | 2.5 |

Figure 6:
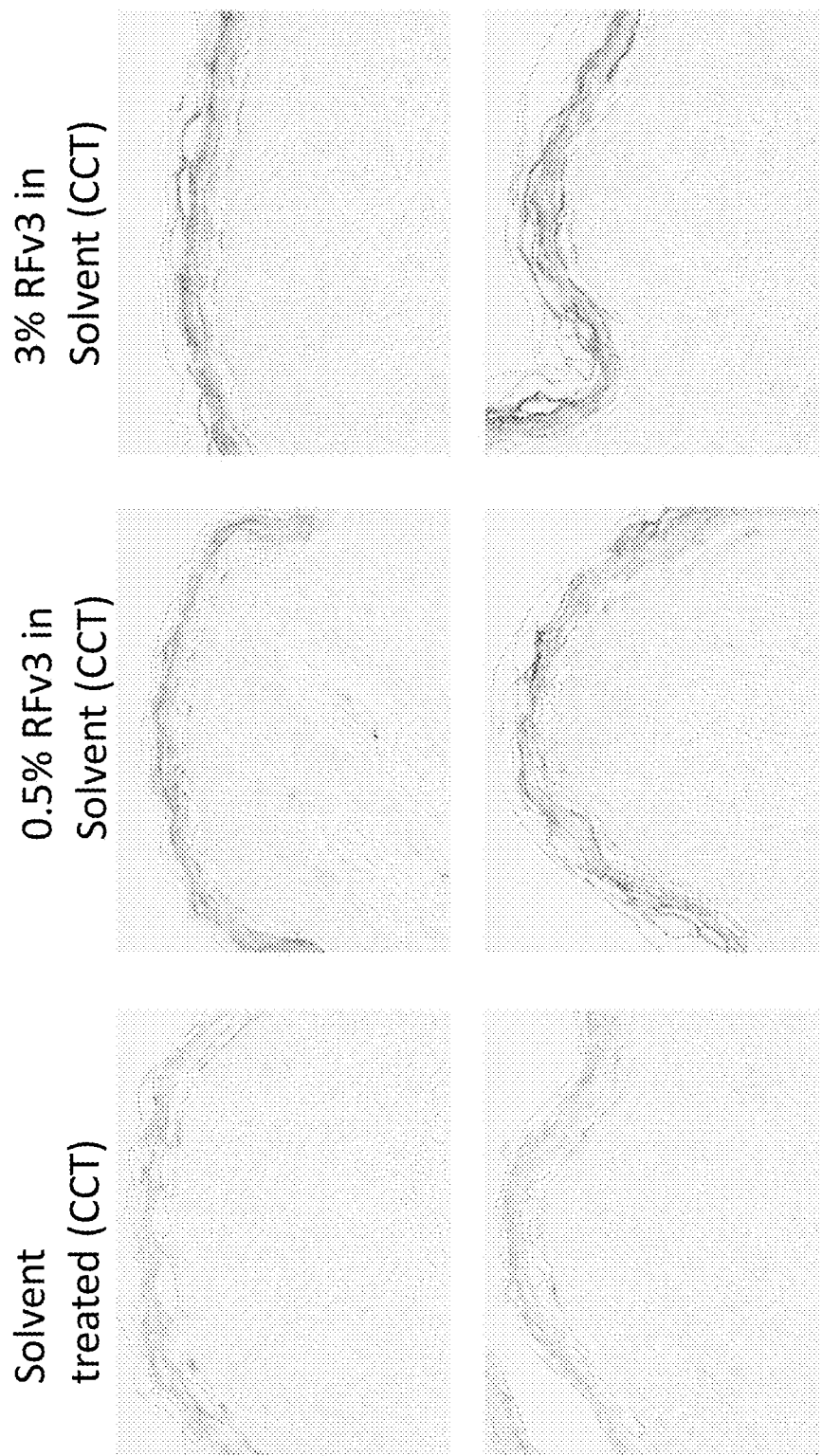
FIG. 6 demonstrates an increase in ceramide expression at day 1 in delipidated explants.
Figure 7:
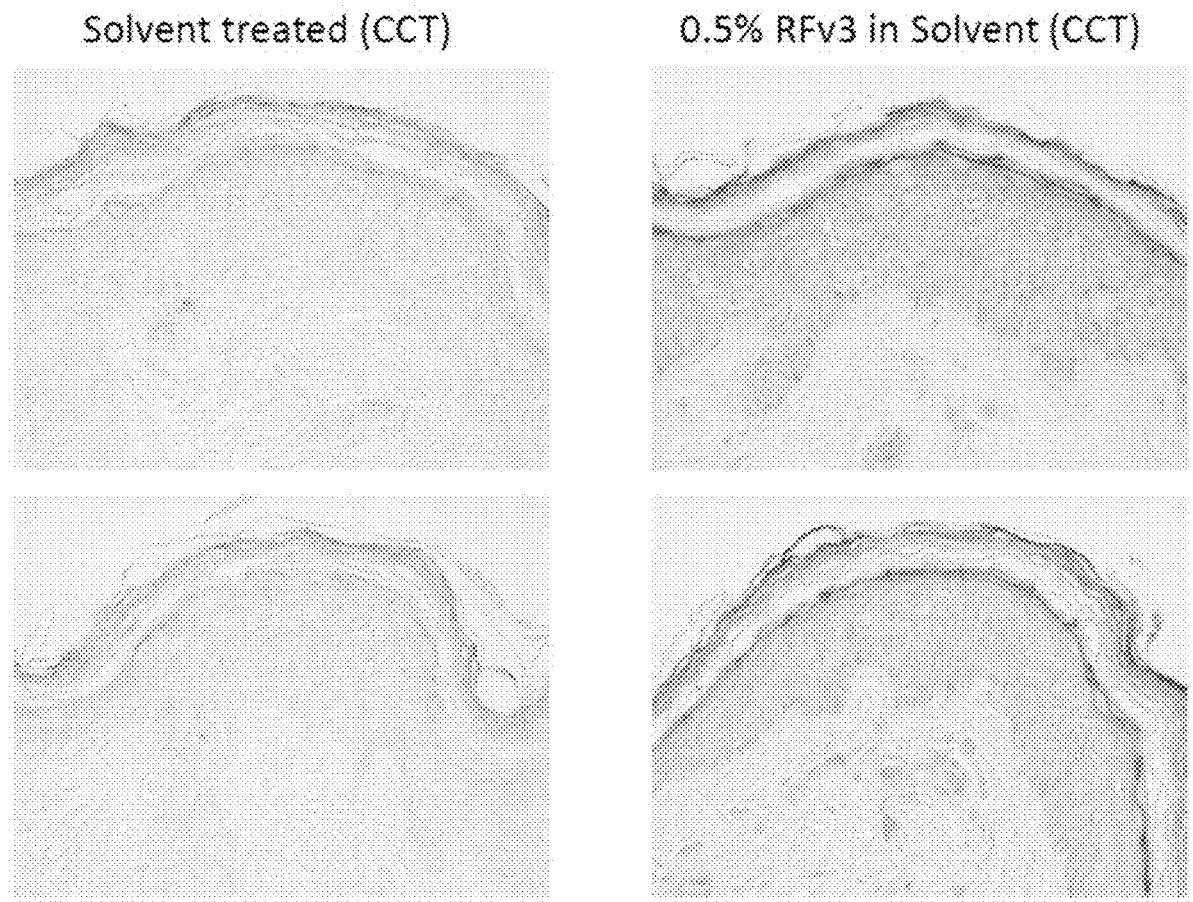
FIG. 7 demonstrates an increase in Transglutaminase-1 (TGM1) expression at day 1 in un-delipidated explants.
Figure 8:
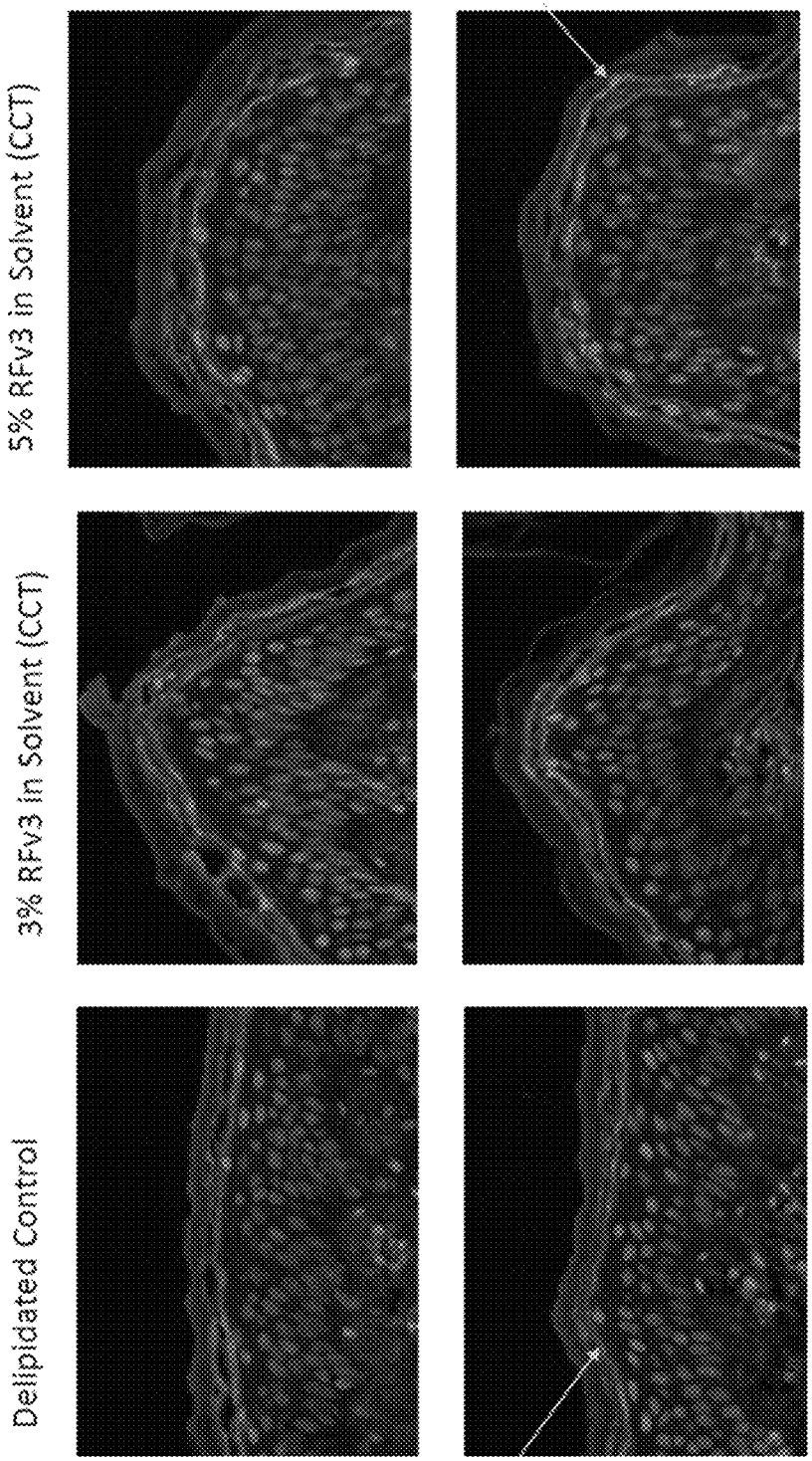
FIG. 8 demonstrates an increase in filaggrin expression at day 1 in delipidated explants.

FIG. 6 demonstrates an increase in ceramide expression at day 1 in delipidated explants. FIG. 7 demonstrates an increase in Transglutaminase-1 (TGM1) expression at day 1 in un-delipidated explants. FIG. 8 demonstrates an increase in filaggrin expression at day 1 in delipidated explants.

Human living skin explants ex vivo barrier repair study report conclusions: All the products are well tolerated by the skin and do not induce any alterations of cellular viability neither in the epidermis nor in the dermis. The excipient (CCT) cosmetic grade experimental sample (E) induces noticeable modifications of ceramides content (day 0+3 h and day 1) and transglutaminase expression (day 1), in absence of delipidation but exhibits no major effect after delipidation. The product P1 (0.5% RFv3) cosmetic grade experimental sample exhibits a moderate skin barrier repairing activity. P1 partially inhibits the delipidation-induced decrease of ceramides (after 3 h and 24 h), TGM1 (after 24 h) and filaggrin (after 3 h). P1 completely inhibits the delipidation-induced decrease of filaggrin (after 24 h). The product P2 (3% RFv3) cosmetic grade experimental sample exhibits a fairly good skin barrier repairing activity. P2 partially inhibits the delipidation-induced decrease of ceramides (after 3 h). P2 completely inhibits the delipidation-induced decrease of ceramides (after 24 h), TGM1 (after 24 h) and filaggrin (after 3 h and 24 h). The product P3 (5% RFv3) cosmetic grade experimental sample exhibits a good skin barrier repairing activity. P3 partially inhibits the delipidation-induced decrease of ceramides (after 3 h) and TGM 1 (after 3 h). P3 completely inhibits the delipidation-induced decrease of ceramides (after 24 h), TGM1 (after 24 h) and filaggrin (after 3 h and 24 h).

These studies additionally demonstrated an increase in TGFB1, a master regulator of skin anti-aging processes and wound healing; a change in keratin expression, i.e. decrease in krt1, an increase in krt5, an increase in krt6B, and a decrease in krt17; an increase in LCE1D, a late cornified envelope protein, an increase in CERS3, ceramide synthase; an increase in CDH1, e-cadherin Ca(2+)-dependent cell-cell adhesion; and an increase in FOXO1, keratinocyte-differentiating.

Example 8: Comparative Blend Studies

Comparative formulation ("EQB Blend"), control, contains 90% Glyceryl Oleate (representing the 90% glyceryl ester of omega fatty acid), 7% Palmitic Acid (representing the 7% plant derived fatty acid), and 3% Hydroxy-resveratrol (representing the 3% a stilbene antioxidant). Experimental formulation ("RFV3 Blend") contains 90% Glyceryl Linoleate and Glyceryl Linolenate (representing the 90% glyceryl ester of omega fatty acid), 7% Ximenynic Acid (representing the 7% plant derived fatty acid), 3% *Pterocarpus marsupium* Bark Extract (representing the 3% a stilbene antioxidant). Each individual component, i.e. Glyceryl Linoleate and Glyceryl Linolenate, Ximenynic Acid, *Pterocarpus marsupium* Bark Extract were also tested. GW590735 was used as a positive control.

Figure 9:
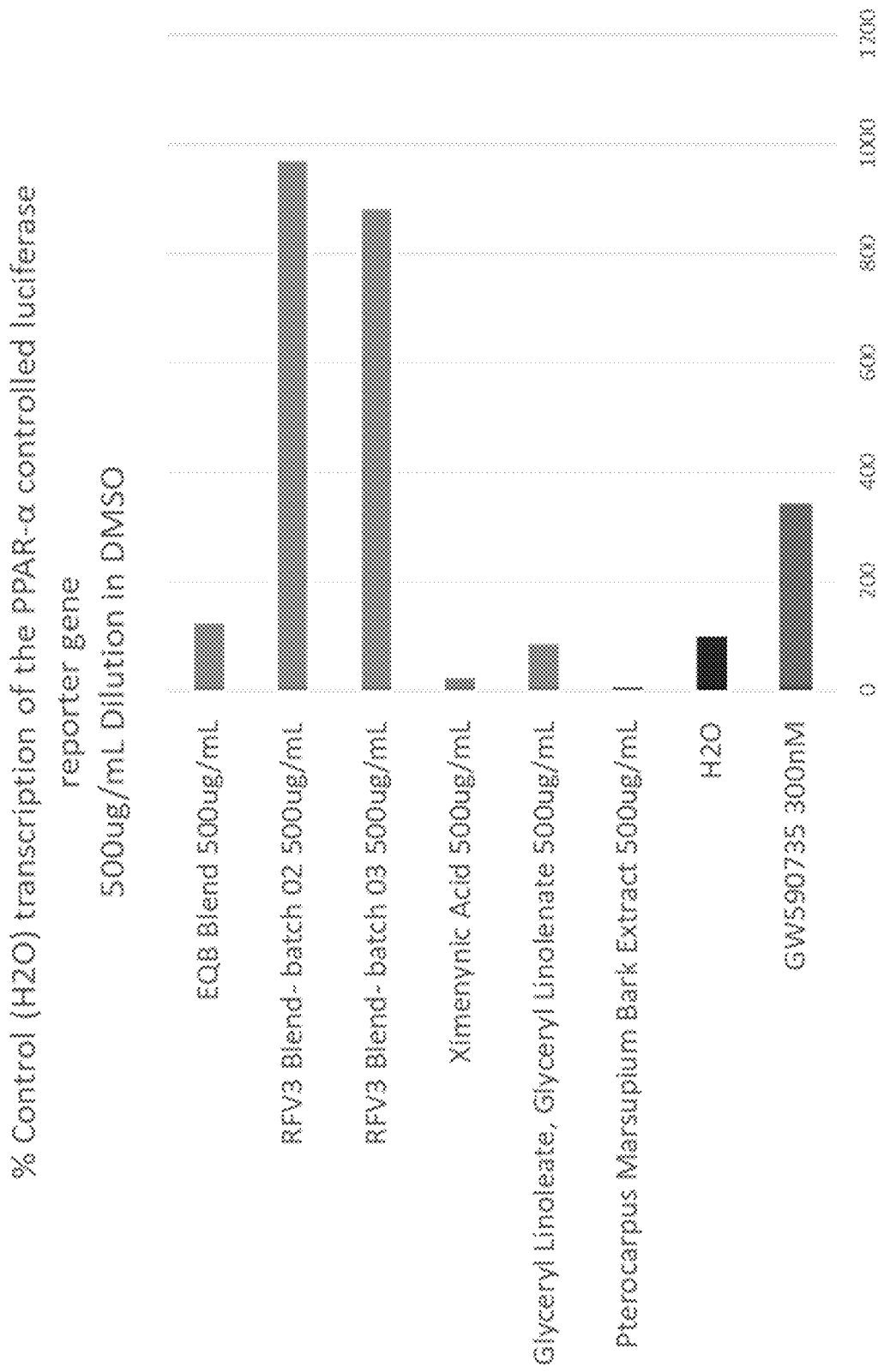
FIG. 9 shows the effect of the comparative blends on the transcription of the PPAR-α controlled luciferase reporter gene.

Results demonstrate that RFV3 produces a high PPAR agonist activity. EQB Blend, a chemically similar blend, is minimally active. Each individual component of the RFv3 Blend is inactive or cyto-toxic. FIG. 9 shows the effect of above test samples on the transcription of the PPAR-α controlled luciferase reporter gene in CHO cells, an epithelial cell line derived from the ovary of the Chinese hamster. Each same was diluted to 500 µg/mL in DMSO. Water (H2O) was used as a blank. Positive control: GW590735 potent and selective agonist of PPARα. EQB Blend, RFV3 Blend, and Glyceryl Linoleate and Glyceryl Linolenate are non-cytotoxic. Ximenynic Acid and *Pterocarpus marsupium* Bark Extract are cytotoxic.

Example 9: Oil-In-Water Barrier Repair Emulsion Formulation

Table 15 provides the formulation for the oil-in-water barrier repair emulsion including the presence of each ingredient in the phases necessary to produce the topical formulation. The oil-in-water barrier repair emulsion is prepared by combining and heating phase A under agitation to 75° C., combining B1 and heating to 75° C. until dissolved, adding B2 premix into B1 under agitation, adding A into B under homogenizing agitation while maintaining temperature at 75° C. for 20 min., adding C into A/B under homogenizing agitation while maintaining temperature at 75° C. for 20 min., replacing the homogenizer with a sweep anchor mixer and allowing to cool to 30° C., adding at 30° C. and continue mixing until product is fully uniform, and adjust pH to 5.3 if needed.

TABLE 15

Oil-in-water Barrier Repair Emulsion Formulation

| Phase | Ingredient INCI | % w/w | Supplier/Trade Name |
|---|---|---|---|
| A | Isononyl Isononanoate | 7.0 | ALZO International Inc/ Wickenol 151 |
| A | Cetyl Alcohol (and) Glyceryl Stearate (and) PEG-75 Stearate (and) Ceteth-20 (and) Steareth-20 | 4.0 | Gattefossé/ Emulium ® Delta MB |
| A | Squalane | 2.0 | Seppic/Phytosqualan |
| A | **Glyceryl Linoleate (and) Xymenynic Acid (and) Glyceryl Linolenate (and) *Pterocarpus Marsupium* Bark Extract | 3.0 | RFV3 Complex** |
| A | Behenyl Alcohol | 1.5 | Sasol Performance Chemicals/NAFOL 1822 C |
| A | Dimethicone | 5.0 | Dow Coming/ XIAMETER(R) PMX-200 SILICONE FLUID 10 CS. |
| A | Caprooyl Phytosphingosine | 0.1 | Evonik/SPHINGOKINE ® NP |
| B1 | Distilled Water | 61.7 | |
| B1 | Adenosine | 0.3 | Any supplier |
| B1 | Niacinamide | 4.0 | Any supplier |
| B2 | Butylene Glycol | 2.0 | Any Supplier |
| B2 | Glycerin | 4.0 | Any Supplier |
| B2 | Xanthan Gum (and) Lecithin (and) Sclerotium Gum (and) Pullulan | 0.4 | Lucas Meyer Cosmetics/ Siligel ™ |
| C | Polyacrylate-13 (and) Polyisobutene (and) Polysorbate 20 | 1.0 | Seppic/Sepiplus 400 |
| D | Phenoxyethanol (and) Ethylhexylglycerin | 1.0 | Schülke Inc./euxyl ® PE 9010 |
| D | Tetrapeptide-21; Glycerin; Butylene Glycol; Aqua | 3.0 | Evonik / TEGO ® Pep 4-17 |

Example 10: Water-In-Oil Brightening Barrier Emulsion Formulation

Table 16 provides the formulation for the water-in-oil brightening barrier emulsion including the presence of each ingredient in the phases necessary to produce the topical formulation. The oil-in-water barrier repair emulsion is prepared by combining and heating phase A under agitation to 85° C., combining and heating phase B under agitation to 85° C., slowly adding Phase B to Phase A while under intensive homogenization, cooling with a sweep mixer to 35° C., and add Phase C ingredients one at a time and homogenize until uniform.

TABLE 16

Water-in-oil Brightening Barrier Emulsion Formulation

| Phase | Ingredient INCI | % w/w | Supplier/Trade Name |
|---|---|---|---|
| A | Isononyl Isononanoate | 5.0 | ALZO International Inc/ Wickenol 151 |
| A | Polyglyceryl-2 Dipolyhydroxy stearate | 5.0 | BASF Care Creations/ Dehymuls ® PGPH |
| A | *Butyrospermum Parkii* (Shea) Butter | 1.5 | AAK AB/Lipex Shea™ |
|   | Hexyl Laurate | 3.0 | BASF Care Creations/ Cetiol ® A |
| A | Triethylhexanoin | 0.5 | Lubrizol/Schercemol™ GTO Ester |
| A | *Cocos Nucifera* (Coconut) Oil | 5.0 | Vantage Specialty Ingredients/Lipovol ® C-76 |
| A | Dimethicone | 3.5 | Dow Corning/ XIAMETER™ PMX-200 Silicone Fluid 2 cSt. |
| A | Bisabolol | 0.5 | Vantage Specialty Ingredients/Lipo ® Bisabolol |
| A | Tetrahexyldecyl Ascorbate | 1.0 | Barnet-Nikko/BV-OSC |
| B | Distilled Water | 65.0 |   |
| B | Sodium Benzoate | 0.2 | Any supplier |
| B | Niacinamide | 4.0 | Any supplier |
| B | Sodium PCA | .0.1 | Any Supplier |
| B | Glycerin | 4.0 | Any Supplier |
| C | **Glyceryl Linoleate (and) Xymenynic Acid (and) Glyceryl Linolenate (and) *Pterocarpus Marsupium* Bark Extract | 1.0 | RFV3 Complex** |
| C | Magnesium Sulfate Heptahydrate | 0.7 | Any Supplier |

Example 11: Anhydrous OTC Skin Protectant Ointment with Barrier Repair Formulation Table 17 provides the formulation for the anhydrous OTC skin protectant ointment with barrier repair including the presence of each ingredient in the topical formulation. The anhydrous OTC skin protectant ointment with barrier repair is prepared by combining and compound the ingredients with high shear mixing at room temperature conditions until uniformly dispersed.

TABLE 17

Anhydrous OTC Skin Protectant Ointment with Barrier Repair Formulation

| Ingredient INCI | % w/w | Supplier/Trade Name |
|---|---|---|
| Isohexadecane (and) Dimethicone/Bis-Isobutyl PPG 20 Crosspolymer | 93.0 | Dow/DOWSIL™ EL-8052 IH Silicone Organic Elastomer Blend |
| **Glyceryl Linoleate (and) Xymenynic Acid (and) Glyceryl Linolenate (and) *Pterocarpus Marsupium* Bark Extract | 5.0 | RFV3 Complex** |
| Dimethicone (OTC Skin Protectant) | 2.0 | Dow/XIAMETER™ PMX-200 Silicone Fluid 350 cSt. |

Example 12: Hair and Scalp Oil Formulation

Table 18 provides the formulation for the hair and scalp oil including the presence of each ingredient in the topical formulation. The hair and scalp oil is prepared by combining and compound the ingredients with high shear mixing at room temperature conditions until uniformly dispersed.

TABLE 18

Hair and Scalp Oil Formulation

| Phase | Ingredient INCI | % w/w | Supplier/Trade Name |
|---|---|---|---|
| A | Caprylic/Capric Triglyceride | 48.0 | Myritol 318/BASF |
| A | Isopropyl Myristate | 18.0 | Isopropyl Myristate/Acme Hardesty Co. |
| A | Isoamyl Cocoate | 22.0 | Tegosoft AC MB/Evonik Operations GmbH |
| A | **Glyceryl Linoleate (and) Xymenynic Acid (and) Glyceryl Linolenate (and) *Pterocarpus Marsupium* Bark Extract | 3.0 | RFV3 Complex** |
| A | *Euterpe Oleracea* Fruit Oil | 2.0 | Açai Oil/Acme Hardesty Co. |
| A | *Pongamia Glabra* Seed Oil | 1.5 | Karanja Oil Virgin/Aldivia |
| A | *Pentaclethra Macroloba* Seed Oil | 1.5 | Pracaxi Oil/Acme Hardesty Co. |
| A | *Orbignya Speciosa* Kernel Oil (and) *Astrocaryum Murumuru* Fruit Extract | 2.0 | Activeshine Amazon 3R/ Chemyunion |
| A | *Oenocarpus Bataua* Fruit Oil | 1.8 | Caribpure™ Pataua Oil/ Caribbean Natural Products Inc. |
| A | Tocopherol | 0.2 | Tocopherol/Ikeda Corp, of America |

Example 13: Deep Conditioning Hair Mask Formulation

Table 19 provides the formulation for the deep conditional hair mask including the presence of each ingredient in the topical formulation. The deep conditional hair mask is prepared by: 1) charging phase A into the tank and heating to 80° C., 2) preparing phase B and heating to 80° C., 3) combining phase B and phase A under high shear conditions, 4) maintaining high shear mixing until emulsified, 5) cooling batch to 50° C., 6) adding C under moderate mixing conditions, and 7) adjusting pH to 5.0-6.0.

TABLE 19

Deep Conditioning Hair Mask Formulation

| Phase | Ingredient INCI | % w/w | Supplier/Trade Name |
|---|---|---|---|
| A | Deionized water | 9.0 | any |
| A | Glycerin | 64.0 | any |
| A | Citric acid 10% solution | 0.05 | any |
| A | Phospholipids | 2.0 | Bio-Signal ™ Lipid 10 MB/Vantage |
| A | Adenosine | 0.1 | any |
| B | Caprylic/Capric Triglyceride | 5.0 | Myritol 318/BASF |
| B | Cetearyl Alcohol (and) Cetearyl Glucoside | 7.85 | MONTANOV ™ 68 MB/Seppic. |
| B | **Glyceryl Linoleate (and) Xymenynic Acid (and) Glyceryl Linolenate (and) *Pterocarpus Marsupium* Bark Extract | 2.0 | RFV3 Complex** |
| B | *Euterpe Oleracea* Fruit Oil | 1.0 | Açai Oil/Acme Hardesty Co. |
| B | *Pongamia Glabra* Seed Oil | 1.5 | Karanja Oil Virgin/Aldivia |
| B | *Pentaclethra Macroloba* Seed Oil | 1.5 | Pracaxi Oil/Acme Hardesty Co. |
| B | *Orbignya Speciosa* Kernel Oil (and) *Astrocaryum Murumuru* Fruit Extract | 2.0 | Activeshine Amazon 3R/Chemyunion |
| B | *Oenocarpus Bataua* Fruit Oil | 1.8 | Caribpure ™ Pataua Oil/Caribbean Natural Products Inc. |
| B | *Crambe Abyssinica* Seed Oil Phytosterol Ester | 1.0 | Abysoft/Natura-tec |
| B | Tocopherol | 0.2 | Tocopherol/Ikeda Corp, of America |
| C | Ethylhexylglycerin (and) Phenoxyethanol | 1.0 | Sharomix ™ EG14/Acme Hardesty Co. |

Example 14: Acne Medication with Sebum Control Formulation

Table 20 provides the formulation for the acne medication with sebum control including the presence of each ingredient in the topical formulation. The acne medication with sebum control is prepared by: 1) heating water to 80° C., slowly adding VEEGUM and xanthan gum as a dry blend while mixing with high shear propeller, 2) adding remaining phase A ingredients and maintaining temperature between 80-85° C., 3) combining Phase B ingredients and heating to 80° C., 4) adding phase B to phase A slowly while homogenizing, 5) cool gradually while sweeping, 6) adding phase C at 30° C. and adjusting pH.

TABLE 20

Acne Medication with Sebum Control Formulation

| Phase | Ingredient INCI | % w/w | Supplier/Trade Name |
|---|---|---|---|
| A | Deionized water | 66.4 | any |
| A | Xanthan gum | 0.5 | any |
| A | Magnesium Aluminum Silicate | 2.5 | VEEGUM Ultra/Vanderbilt |
| A | Pentylene Glycol | 4.0 | any |
| A | Phytic Acid (and) Aqua | 0.1 | dermofeel ® PA/Evonik Dr. Straetmans GmbH |
| A | Glycereth-18 Ethylhexanoate (and) Glycereth-18 | 3.0 | HESTG-18-O/Ethox Chemicals |
| B | Salicylic Acid (USP) | 1.0 | any |
| B | Cetearyl Alcohol (and) Cetearyl Glucoside | 1.5 | MONTANOV ™ 68 MB/Seppic. |
| B | **Glyceryl Linoleate (and) Xymenynic Acid (and) Glyceryl Linolenate (and) *Pterocarpus Marsupium* Bark Extract | 1.5 | RFV3 Complex** |
| B | Stearic acid | 2.0 | any |
| B | Steareth-21 | 1.0 | any |
| B | Steareth-2 | 3.0 | any |
| B | PPG-11 Stearyl Ether | 9.0 | TEGOSOFT ® APS/Evonik Operations GmbH |
| B | Dimethicone | 1.5 | DC 200 Fluid, 350 cST (Dow) |
| B | Cetyl alcohol | 1.0 | Any |
| B | Maltodextrin - *Syringa Vulgaris* (Lilac) Leaf Cell Culture Extract | 1.0 | DERMASYR 10/Sederma |
| C | Ethylhexylglycerin (and) Phenoxyethanol | 1.0 | Sharomix ™ EG14/Acme Hardesty Co. |
| C | Tromethamine | q.s adjust pH to 3.6-4.0 | TRIS AMINO ® ULTRA PC/ANGUS Chemical Company |

The disclosures of each and every patent, patent application, publication, and accession number cited herein are hereby incorporated herein by reference in their entirety.

While present disclosure has been disclosed with reference to various embodiments, it is apparent that other embodiments and variations of these may be devised by others skilled in the art without departing from the true spirit and scope of the disclosure. The appended claims are intended to be construed to include all such embodiments and equivalent variations.

The invention claimed is:

1. A composition comprising an effective amount of glyceryl linoleate, glyceryl linolenate, xymenynic acid, and *Pterocarpus marsupium* bark extract.

2. The composition of claim 1, wherein the effective amount of glyceryl linoleate is about 75% to about 94% by weight of the composition.

3. The composition of claim 1, wherein the effective amount of glyceryl linolenate is about 5% to about 10% by weight of the composition.

4. The composition of claim 1, wherein the effective amount of xymenynic acid is about 5% to about 10% by weight of the composition.

5. The composition of claim 1, wherein the effective amount of *Pterocarpus marsupium* bark extract is about 1% to about 5% by weight of the composition.

6. The composition of claim 1, wherein the effective amount of glyceryl linoleate is 75% to 94% by weight of the composition, glyceryl linolenate is 5% to 10% by weight of the composition, xymenynic acid is 5% to 10% by weight of the composition, and *Pterocarpus Marsupium* bark extract is 1% to 5% by weight of the composition.

7. A topical formulation comprising a composition of an effective amount of the following PPAR agonists: glyceryl linoleate, glyceryl linolenate, xymenynic acid, and *Pterocarpus marsupium* bark extract, and pharmaceutically or cosmetically acceptable excipients, wherein the formulation is suitable for topical administration.

8. The topical formulation of claim 7, wherein glyceryl linoleate is in an amount of about 0.375% to about 4.7% by weight of the topical formulation.

9. The topical formulation of claim 7, wherein glyceryl linolenate is in an amount of about 0.025% to about 0.5% by weight of the topical formulation.

10. The topical formulation of claim 7, wherein xymenynic acid is in an amount of about 0.025% to about 0.5% by weight of the topical formulation.

11. The topical formulation of claim 7, wherein *Pterocarpus marsupium* bark extract is in an amount of about 0.005% to about 0.25% by weight of the topical formulation.

12. A method of inducing skin barrier repair comprising topically administering a topical formulation of claim 7.

13. The method of claim 12, wherein inducing skin barrier repair results in the biosynthesis of barrier lipids and proteins in the skin selected from the group consisting of ceramides, filaggrin, trans-glutaminase 1, TGFB1, keratins, LCE1D, CERS3, CDH1, FOXO1, HSP27, involucrin, loricrin, beta-glucocerebrosidase, aquaporin 3, ABCA12, ADRP, FIAF, and combinations thereof.

14. The method of claim 12, wherein inducing skin barrier repair results in the modulation of the expression of barrier genes in the skin selected from the group consisting of ceramides, filaggrin, trans-glutaminase 1, TGFB1, keratins, LCE1D, CERS3, CDH1, FOXO1, HSP27, involucrin, loricrin, beta-glucocerebrosidase, aquaporin 3, ABCA12, ADRP, FIAF and combinations thereof.

15. A method of improving aging skin comprising topically administering a topical formulation of claim 7, wherein the improvement of aging skin is selected from the group consisting of smoothness, hydration and texture.

16. A method of preventing skin damage comprising topically administering a topical formulation of claim 7.

17. A method of treating photo-damage and hyperpigmentation comprising topically administering a topical formulation of claim 7.

18. A method of improving skin barrier function comprising topically administering a topical formulation of claim 7.

19. A method of mitigating irritation comprising topically administering a topical formulation of claim 7.

20. A method of supporting the skin's natural ability to defend itself against environmental stressors comprising topically administering a topical formulation of claim 7.

* * * * *